(12) United States Patent
Wolber

(10) Patent No.: US 12,422,014 B1
(45) Date of Patent: Sep. 23, 2025

(54) LOW-FRICTION WEAR SURFACES FOR SEDIMENT FILTRATION SYSTEM HYDRAULIC DAMPER

(71) Applicant: LiquiTech, Inc., Lombard, IL (US)

(72) Inventor: Scott T. Wolber, Carpentersville, IL (US)

(73) Assignee: LiquiTech, Inc., Lombard, IL (US)

( * ) Notice: Subject to any disclaimer, the term of this patent is extended or adjusted under 35 U.S.C. 154(b) by 0 days.

(21) Appl. No.: 19/080,546

(22) Filed: Mar. 14, 2025

(51) Int. Cl.
  *F16F 9/36* (2006.01)
  *F16F 9/18* (2006.01)
  *F16F 9/32* (2006.01)

(52) U.S. Cl.
  CPC ............... *F16F 9/362* (2013.01); *F16F 9/18* (2013.01); *F16F 9/3271* (2013.01); *F16F 2224/0291* (2013.01); *F16F 2230/30* (2013.01)

(58) Field of Classification Search
  CPC .. F16F 9/18; F16F 9/3271; F16F 9/362; F16F 2230/30; F16F 2224/0291
  See application file for complete search history.

(56) References Cited

U.S. PATENT DOCUMENTS

| | | | | |
|---|---|---|---|---|
| 2,649,936 A | * | 8/1953 | Crabtree | F16F 9/362 |
| | | | | 188/315 |
| 3,944,488 A | | 3/1976 | Moatti | |
| 4,529,181 A | * | 7/1985 | Wallis | B21D 24/02 |
| | | | | 277/529 |
| 4,812,230 A | * | 3/1989 | Gerulis | B01D 29/64 |
| | | | | 210/DIG. 17 |
| 4,897,186 A | * | 1/1990 | Gerulis | B01D 29/70 |
| | | | | 210/111 |
| 5,674,392 A | * | 10/1997 | Christophe | B01D 29/413 |
| | | | | 210/411 |
| 6,197,192 B1 | * | 3/2001 | Smith-Haddon | B01D 29/114 |
| | | | | 210/426 |
| 7,632,398 B2 | * | 12/2009 | Cummings | B01D 35/153 |
| | | | | 210/167.04 |
| 2006/0144768 A1 | | 7/2006 | Harris | |
| 2008/0282905 A1 | | 11/2008 | Savage et al. | |

(Continued)

FOREIGN PATENT DOCUMENTS

| | | |
|---|---|---|
| CN | 105780829 B | 12/2017 |
| CN | 209865437 U | 12/2019 |

(Continued)

OTHER PUBLICATIONS

"ABW Self-Cleaning Water Filter Animation" by Tekleen Automatic Filters LLC. Jun. 11, 2024. Last accessed from [https://www.youtube.com/watch?v=irfQ7BT38KU] on Jan. 6, 2025.

*Primary Examiner* — Robert A. Siconolfi
*Assistant Examiner* — James K Hsiao
(74) *Attorney, Agent, or Firm* — Banner & Witcoff, Ltd.

(57) ABSTRACT

Aspects of the present disclosure are directed to hydraulic dampers. A hydraulic damper may include a hydraulic damper rod support having a low-friction wear surface between the hydraulic damper rod and an interior surface of the hydraulic damper housing and having a low-friction wear surface between the hydraulic damper rod and a hydraulic damper rod guide. In some examples, the hydraulic damper may be connected to a sediment filtration system, and the hydraulic damper rod may drive a cleaning armature of the sediment filtration system.

20 Claims, 18 Drawing Sheets

(56) References Cited

U.S. PATENT DOCUMENTS

| | | | |
|---|---|---|---|
| 2010/0116607 A1* | 5/2010 | Lun | F16F 9/362 |
| | | | 188/267.2 |
| 2014/0048279 A1 | 2/2014 | Holderman | |
| 2019/0300413 A1 | 10/2019 | Lovegrove | |
| 2020/0355274 A9* | 11/2020 | Wei | F25B 41/30 |

FOREIGN PATENT DOCUMENTS

| | | |
|---|---|---|
| CN | 211777915 U | 10/2020 |
| CN | 113339352 A | 9/2021 |
| CN | 218971981 U | 5/2023 |
| DE | 7836086 U1 | 9/1980 |
| GB | 1155714 A | 6/1969 |
| WO | 9822198 A1 | 5/1998 |

\* cited by examiner

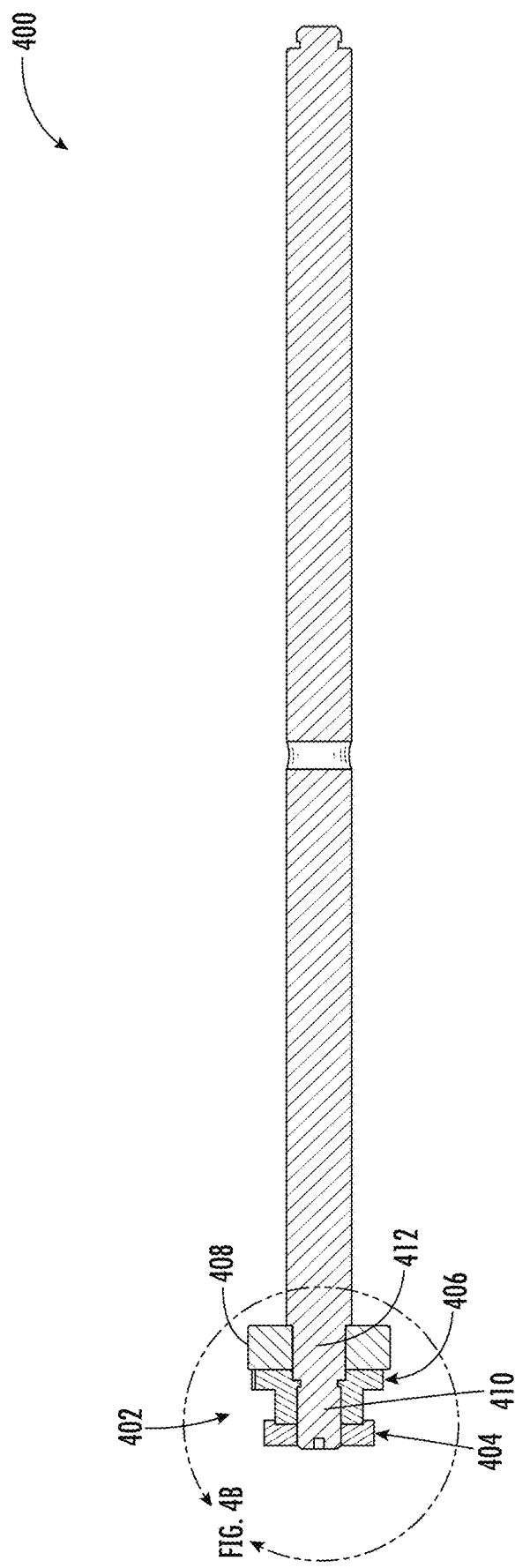

LOW-FRICTION WEAR SURFACES FOR SEDIMENT FILTRATION SYSTEM HYDRAULIC DAMPER

FIELD

The present disclosures generally relate to sediment filtration systems, more particularly relate to hydraulic dampers used to perform a flushing sequence in sediment filtration systems, and more specifically relate to reducing wear on the internal components of such hydraulic dampers.

BACKGROUND

Sediment filtration systems are used to filter sediment from water such as debris, dirt, and other particulates. Some example sediment filtration systems trap the particulates against the surfaces of internal screens while allowing substantially sediment-free water to pass. Over time, the trapped sediment accumulates on the surfaces of the internal screens requiring cleaning to ensure a consistent flow of water through the system. A flushing sequence cleans the surfaces of the internal screens removing the accumulated sediment. Some example sediment filtration systems may use radial suction nozzles that rotate within a filtration chambers to clean the accumulated sediment from the surfaces of the internal screens. The radial suction nozzles, in these examples, are attached to an axial armature that linearly moves back and forth through the filtration chamber. The linear movement of the armature and the rotational movement of the suction nozzles, in these examples, create a helical vacuum effect on the accumulated sediment, which is drawn into the suction nozzles and carried away to a flush valve where it is flushed from the system. In some example, sediment filtration systems may be self-cleaning whereby the flushing sequence is triggered by an increase in water pressure that results from sediment accumulation.

SUMMARY

The present disclosures are directed to improvements to sediment filtration systems. As noted above, sediment filtration systems may include an internal armature that moves linearly within a filtration chamber with radial suction nozzles that rotate to clean accumulated sediment from the internal screens of the system. In some example sediment filtration systems, a hydraulic damper attaches to the armature and facilitates its linear movement through the filtration chamber. In some examples, the hydraulic damper may take the form of a piston. Such hydraulic dampers, however, can be prone to failure. For example, friction between the hydraulic damper's internal contact surfaces can result in wear that introduces surface imperfections such as scoring on those contact surfaces. Excessive friction between contact surfaces, particularly stainless steel contact surfaces, can result in galling and other adhesive wear which can, in turn, cause stuttering, seizing, and other improper motion of the hydraulic damper during operation. Stuttered or incomplete movement of the hydraulic damper may impair the cleaning of the accumulated sediment from the internal screens of the sediment filtration system, and the sediment filtration system may be rendered inoperable if the hydraulic damper seizes altogether. Surface imperfections caused by the wear also can lead to leaks at the sealing surfaces of the hydraulic damper, which may delay necessary cleaning of the accumulated sediment by stalling the increase in the water pressure that triggers a flush cycle thereby limiting the ability for any sediment removal device (e.g., a vacuuming device) to adequately scan across the internal screen during cleaning. Systems with impaired cleaning capabilities may require more frequent cleaning and thus trigger more frequent flush cycles resulting in excessive wear on the hydraulic damper components thereby accelerating hydraulic damper failure. Aside from the cost and time needed to repair or replace failed hydraulic dampers, downtime resulting from hydraulic damper failure can impact the water quality of the filtered water supply.

To address these challenges, the present disclosures provide improvements to hydraulic dampers for sediment filtration systems. As described herein, a hydraulic damper for a sediment filtration system may include a hydraulic damper rod guide (or simply rod guide) that supports the hydraulic damper rod (or simply rod) and its retaining components away from the internal surface of the hydraulic damper using low-friction bushings. By supporting the rod in the low-friction bushings, the rod guide reduces, minimizes, or avoids surface wear on the rod and on the internal surface of the hydraulic damper. The low-friction bushings also allow the rod to move more steadily and more readily through the hydraulic damper. The low-friction bushings physically separates the surface of the rod from the internal surface of the hydraulic damper. By preventing the surface of the rod and its retaining components from contacting the internal surface of the hydraulic damper, the low-friction bushing helps to avoid adhesive wear, erosive wear, or other mechanical wear between these surfaces. Reducing wear on the rod and the internal surface of the hydraulic damper thus helps to reduce, minimize, and avoid galling on these surfaces, seizing of the hydraulic damper, and leaking at the sealing surfaces. These improvements to the hydraulic dampers in sediment filtration systems thus help to reduce or minimize downtime due to repairing or replacing failed hydraulic dampers thereby improving the filtered water supply and improves the safety of those that rely on in by protecting them from potential contaminants. Such protection may be critical in certain applications where a clean water supply is necessary such as, for examples, medical facilities, office facilities, housing facilities, manufacturing facilities, and the like. These and other advantages will be appreciated upon review of the disclosures herein.

BRIEF DESCRIPTION OF THE DRAWINGS

The present disclosure is illustrated by way of example and not limited in the accompanying figures in which like reference numerals indicate similar elements and in which:

FIG. 4A depicts a side cross-sectional view an example rod and an example rear rod support assembly according to various aspects described herein;

DETAILED DESCRIPTION

In the following description, reference is made to the accompanying drawings, which form a part hereof, and in which is shown by way of illustration various examples in which the disclosure may be practiced. It is to be understood that other examples may be utilized and implemented whereby structural and functional modifications may be made without departing from the scope and spirit of the present disclosure. Further, headings within this disclosure should not be considered as limiting aspects of the disclosure. Those skilled in the art with the benefit of this disclosure will appreciate that the examples are not limited to the headings.

Figure 1:
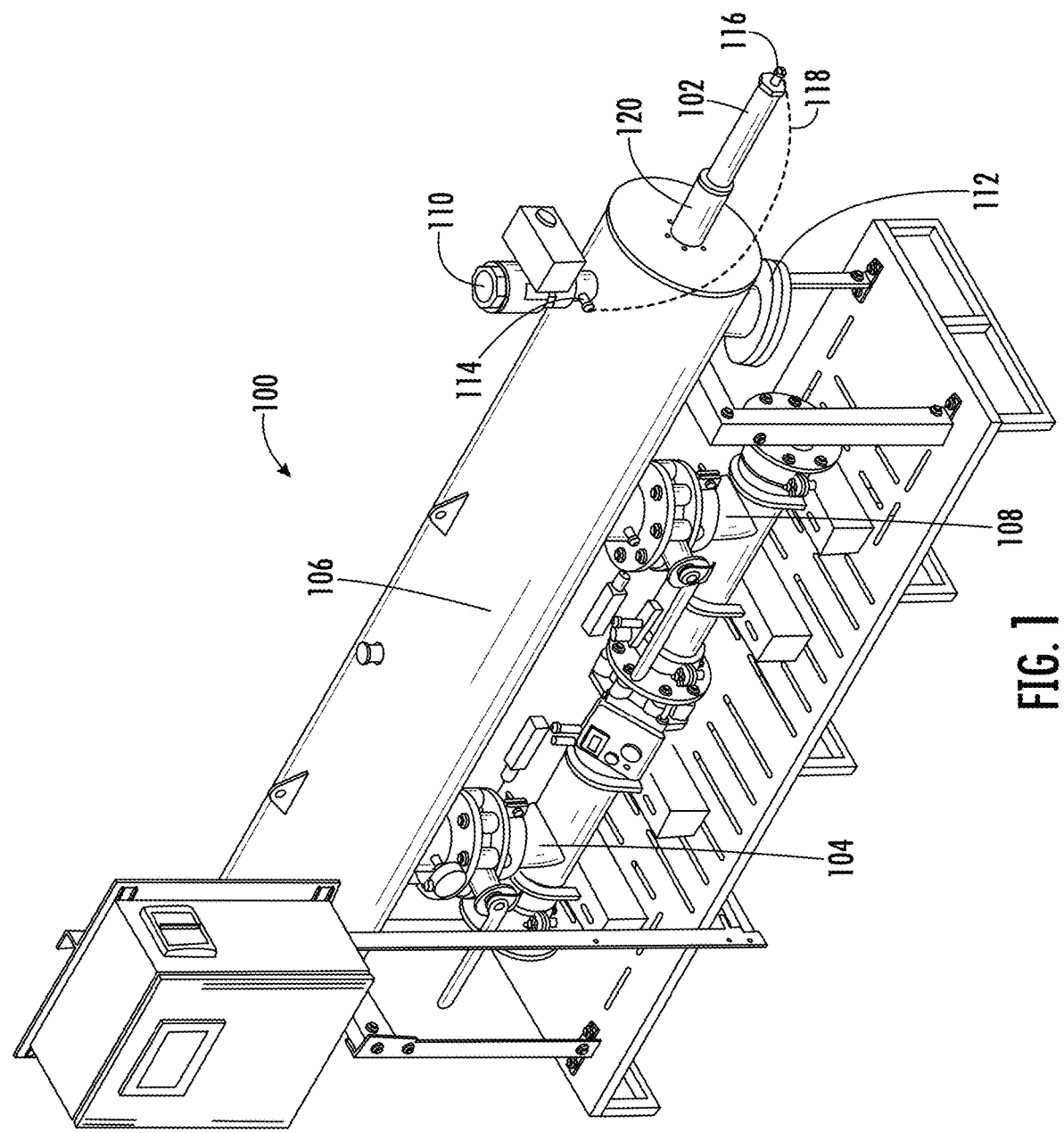
FIG. 1 depicts a perspective view of an example sediment filtration system according to various aspects described herein.

As noted above, aspects of this disclosure relate to improvement to sediment filtration systems. FIG. 1 depicts a perspective view of an example sediment filtration system 100 according to various aspects described herein. For ease of reference, not every aspect of the sediment filtration system is described or illustrated. Rather the present disclosures focus on aspects relating to the hydraulic damper 102 (e.g., a piston) of the sediment filtration system 100, which operates during a flush cycle of the system. As to other aspects of the sediment filtration system 100, those skilled in the art will appreciate its operation, and it will suffice to generally describe the filtration process. As seen in FIG. 1, for example, the sediment filtration system 100 includes a fluid intake pipe 104, a filtration housing 106, and a fluid outflow pipe 108. The filtration housing 106 may include one or more interior filtration chambers (not shown) that trap sediment against the surface of one or more screens (not shown) as fluid passes from the fluid intake pipe 104 to the fluid outflow pipe 108. As described above, a cleaning armature or arm (not shown) may be disposed within the main filtration housing (e.g., within one of the interior filtration chambers) and configured to clean accumulated sediment from the one or more screens. The cleaning armature also may be configured to transport the sediment cleaned from the one or more screens to a flushing chamber (not shown) that is in fluid communication with a flush valve 110 and a flush outflow pipe 112. The hydraulic damper 102 may include a tip (FIGS. 8A-B) that mechanically couples to and engages with the cleaning armature. The flush valve 110 and the hydraulic damper 102, in this example, include a respective tube connector 114 and 116 (which also may be referred to as a flush nipple). Tubing 118 connects the tube connector 114 of the flush valve 110 to the tube connector of the hydraulic damper 102. During filtration, the flush value 110 is closed resulting in fluid flowing through the tubing 118 and into the hydraulic damper 102 via the tube connector 116. The pressure from the fluid flowing into the hydraulic damper 102 pushes a rod (FIGS. 2A-B) in a direction toward the filtration housing 106. During a flush cycle, the flush valve 110 opens, which results in a fluid pressure drop locally at the tube connector 114. This fluid pressure drop causes fluid to evacuate the hydraulic damper 102 via the tube connector 116 and back through the tubing into the flush chamber. This evacuation of the fluid from the hydraulic damper 102 pulls the rod in a direction away from the filtration housing 106 drawing the cleaning armature across the one or more screens of the sediment filtration system, which cleans the accumulated sediment from the one or more screens and transports it to the flush chamber where it evacuates the filtration housing 106 via the flush outflow pipe 112. At the end of the flush cycle, the flush valve 110 is closed allowing fluid to once again flow into the tubing 118 via the tube connector 114 of the flush valve and into the hydraulic damper 102 via its tube connector 116 where it again pushes the rod toward the filtration housing 106 in advance of the next flush cycle. In this way, the sediment filtration system 100 may be self-cleaning and initiate a flush cycle based on a threshold increase in fluid pressure within the filtration housing 106. The hydraulic damper 102, therefore, may provide or otherwise facilitate the linear movement of the cleaning armature through the filtration housing and rely on the pressure of the fluid through the sediment filtration system to drive such movement. As seen in the example sediment filtration system 100 of FIG. 1, the hydraulic damper 102, in this example, is attached to the filtration housing 106 via a collar 120 (sleeve). In this example, the end of the hydraulic damper 102 that is opposite the end having the tube connector 116 is disposed within the collar 120. As described in further detail below, the end of the hydraulic damper 102 disposed within the collar 120 may include one or more sealing mechanisms to prevent fluid from leaking to the exterior of the filtration housing 106.

Simply for convenience and without limitation, the following terminology is adopted to refer to various dimensions of the components described herein. An axial direction refers to a direction along a longitudinal axis of the hydraulic damper 102 (i.e., along the length of the hydraulic damper) toward or away from the filtration housing 106 of the sediment filtration system. A radial direction refers to a direction along a radius that is perpendicular to and extends away from the longitudinal axis of the hydraulic damper 102. An axial thickness (t) refers to the thickness of a solid (non-empty) component in an axial direction. An axial width (w) refers to the width of a space (e.g., a cavity, chamber, aperture, etc.) in an axial direction. An axial length (l) refers to a length in an axial direction. A diameter (d), including an inner diameter (id) and outer diameter (od), refer to the diameter of a component in a radial direction.

Figure 2A:
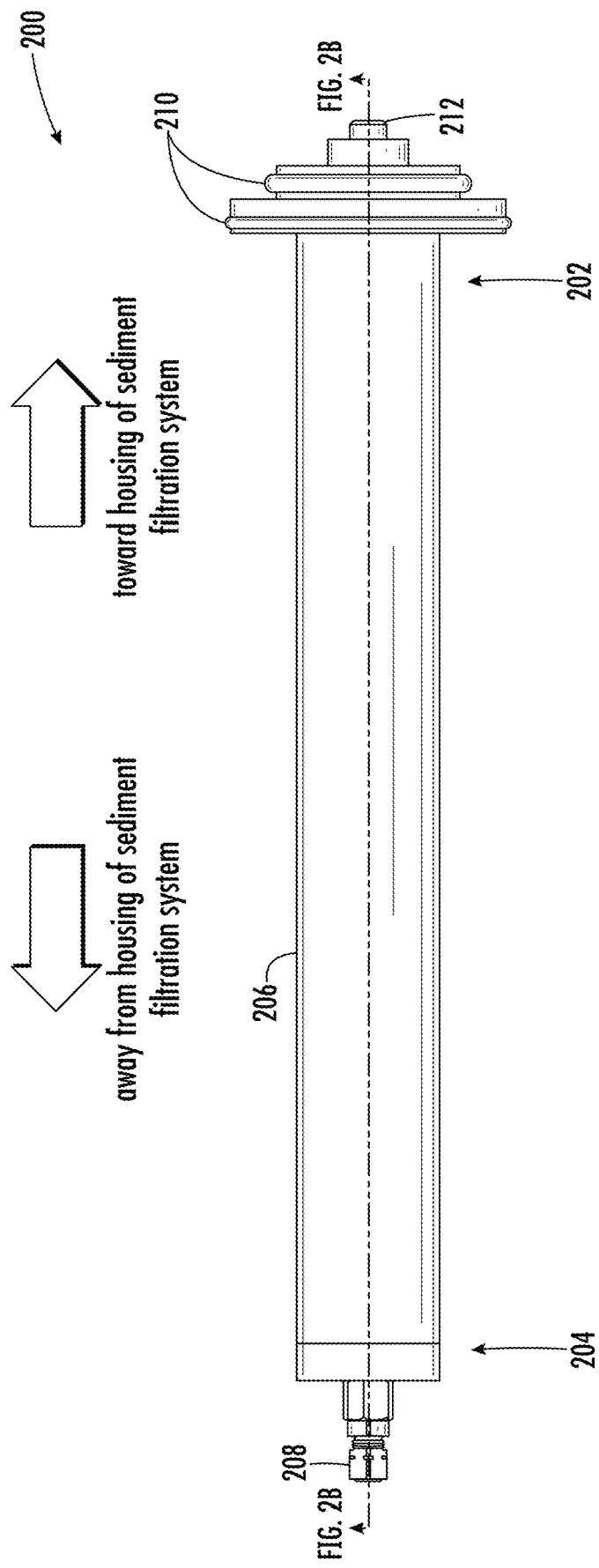
FIG. 2A depicts a side view of an example hydraulic damper of a sediment filtration system according to various aspects described herein.
Figure 2B:
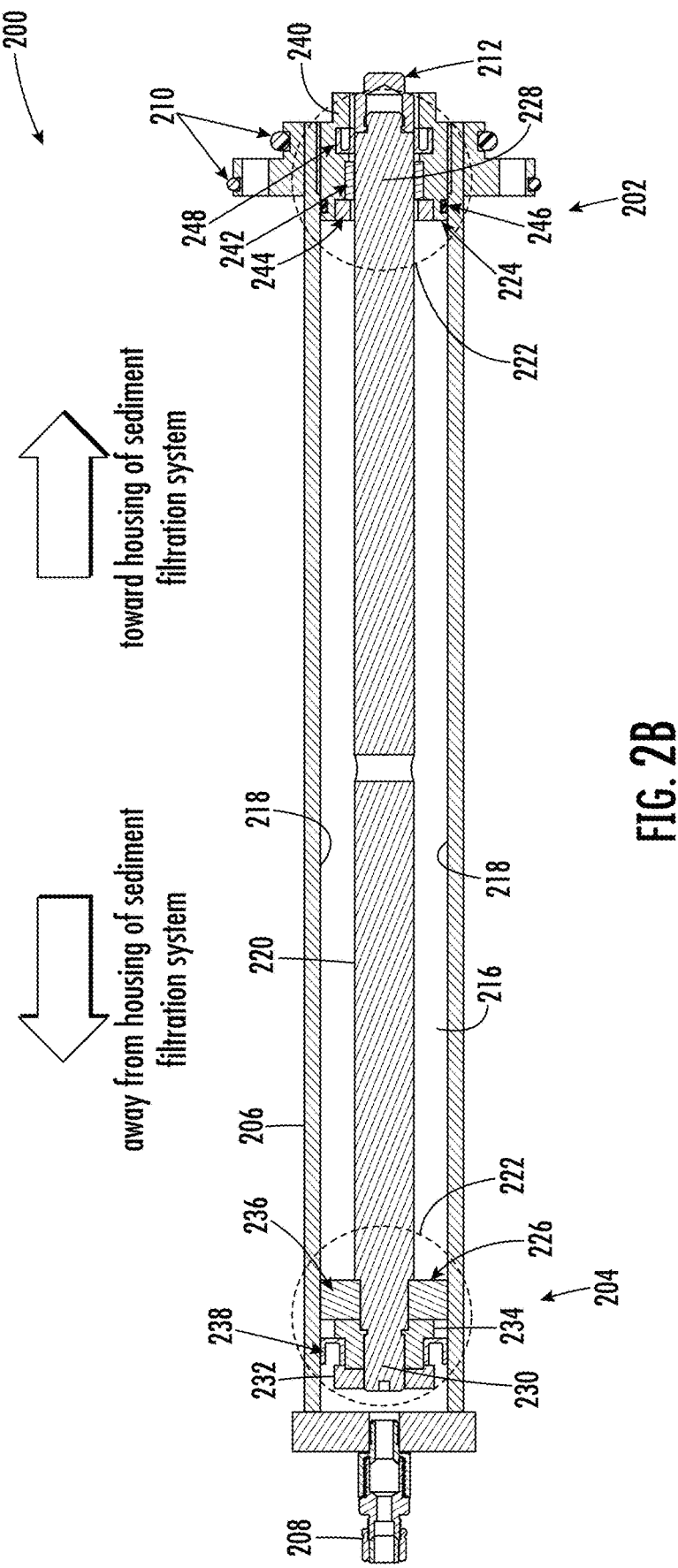
FIG. 2B depicts a side cross-sectional view of the hydraulic damper of FIG. 2A.

FIGS. 2A and 2B respectively depict a side view and a side cross-sectional view of a hydraulic damper 200 of a sediment filtration system (e.g., sediment filtration system 100 of FIG. 1) according to various aspects described herein.

The cross-sectional view shown in FIG. 2B is along dashed line labeled "FIG. 2B" of FIG. 2A.

With reference to FIG. 2A, the hydraulic damper 200, in this example, has an elongated cylindrical shape with a first end 202 that, when installed at a sediment filtration system, is disposed towards the filtration housing of the sediment filtration system and a second end 204 opposite the first end 202 that, when installed at the sediment filtration system, is disposed away from the housing of the sediment filtration system. A hydraulic damper housing 206 (or simply housing) extends between the first end 202 and the second end 204 of the hydraulic damper 200. For convenience and without limitation, the first end 202 of the hydraulic damper 200 may be referred to as the forward end (or front end) of the hydraulic damper due to its location relatively closer to the housing of the sediment filtration system, and the second end 204 of the hydraulic damper may be referred to as the rear end of the hydraulic damper due to its location relatively farther from the housing of the sediment filtration system. As described above with reference to FIG. 1, the hydraulic damper 200, in this example, includes a tube connector 208 at the second end 204 of the hydraulic damper 200. As also described above, tubing (not shown) may be attached, connected, or otherwise affixed to the tube connector 208 to establish a fluid connection between the hydraulic damper 200 and the flush valve of a sediment filtration system. The hydraulic damper 200, in this example, also includes sealing mechanisms 210 and a hydraulic damper tip 212 (or simply tip). As noted above, the tip 212, in this example, couples to and engages with a cleaning armature of the sediment filtration system. As also noted above and described in further detail below, based on the fluid pressure within the sediment filtration system, the tip 212 is driven forward in a direction toward the housing of the sediment filtration system and pulled backward in a direction away from the housing of the sediment filtration system, which in turn drives the cleaning armature forward and backward.

With reference to FIG. 2B, a side-cross sectional view of the hydraulic damper 200 is shown. As seen in FIG. 2B, the housing 206 defines an internal chamber 216 having an interior surface 218. The hydraulic damper 200, in this example, also includes a rod 220 and a hydraulic damper rod support 222 (or simply rod support) that are disposed with the internal chamber 216 of the hydraulic damper. As seen in FIG. 2B and described in further detail below, the rod support 222 is configured to support the rod 220 within the internal chamber 216 of the hydraulic damper 200 such that the rod does not contact the interior surface 218 of the internal chamber while still allowing the rod to freely move forward and backward between an extended position and an retracted position. The rod 220 shown by way of example in FIG. 2B is depicted in a retracted position. By supporting the rod 220 such that there is no contact between the surface of the rod and the interior surface 218 of the internal chamber 216, adhesive wear, erosive wear, or other mechanical wear between these surfaces is advantageously avoided thereby reducing, minimizing, or avoiding galling, scoring, or creating other surface imperfections that can lead to seizing or other improper (undesirable) motion during operation and/or leakage.

The rod support 222, in this example, is implemented using a pair of rod support assemblies 224 and 226 (or simply rod support assemblies) that each support a respective end 228 and 230 of the rod 220. For example, the rod support 222, includes a first rod support assembly 224 disposed within the internal chamber 216 of the housing 206 and positioned at the forward end 202 of the hydraulic damper 200 and a second rod support assembly 226 disposed within the internal chamber of the housing and positioned at the rear end 204 of the hydraulic damper. Again for convenience and without limitation, based on their position relative to the housing of the sediment filtration system, the first rod support assembly 224 and the first end 228 of the rod 220 may be referred to as the forward rod support assembly 224 and the forward end 228 of the rod, and the second rod support assembly 226 and the second end 230 of the rod may be referred to as the rear rod support assembly 226 and the rear end 230 of the rod. As described herein, the front rod support assembly 224 is mounted to the interior surface 218 of the internal chamber 216 such that the front rod support assembly remains stationary as the rod 220 moves between the extended position and the retracted positions, and the rear rod support assembly 226 is slidably disposed within the internal chamber such that the rear rod support assembly moves (slides) with the rod as the rod moves between the extended position and the retracted position.

The rear rod support assembly 226, in this example, includes a seal retainer 232, a seal base 234, and a low-friction bushing 236. The seal retainer 232, seal base 234, and low-friction bushing 236, in this example, each have a generally annular (ring-like) shape. Each of the seal retainer 232, seal base 234, and low-friction bushing 236, in this example, include a central aperture (e.g., a generally circular aperture) that the rear end 230 of the rod 220 extends through when the hydraulic damper 200 is in its assembled configuration. The rod 220, seal retainer 232, and seal base may be threaded components that allow the seal retainer and seal base to mechanical couple to the rod. For example, the rear end 230 of the rod 220 may include threads that mechanically engage with respective threads respectively formed on interior surfaces of the central apertures of the seal retainer 232 and seal base 234. The seal retainer and seal base, therefore, may be screwed on to the rear end of the rod in some examples. As described in further detail below with reference to FIGS. 4A and 4B, the seal retainer 232 and seal base 234 secure the low-friction bushing 236 of the rear end 230 of the rod 220. The seal retainer 232 and seal base 234 may be formed from any suitable material including, for example, stainless steel. The low-friction bushings also may be described as low-friction bearings.

As seen in FIG. 2B, the maximum outer diameters (od) of the seal retainer 232 and the seal base 234 is less than the inner diameter (id) of the internal chamber 216 of the housing 206. As also seen in FIG. 2B, the low-friction bushing 236 is in contact with the interior surface 218 of the internal chamber 216 of the housing 206. The outer diameter of the low-friction bushing 236, therefore, is sufficient to maintain contact with the interior surface 218 of the internal chamber 216 of the housing 206 while allowing freedom of movement sufficient for driving the cleaning armature of the sediment filtration system during a flush cycle. In this regard, the outer diameter of the low-friction bushing 236 may be about the same as (e.g., within a threshold tolerance of) the inner diameter of the internal chamber 216 of the housing 206. In some examples, suitable tolerances may be between about 5-10 thousandths of an inch (about 0.005 to about 0.010 in.). With the outer diameter of the low-friction bushing 236 being larger than that maximum outer diameters of the seal retainer 232 and seal base 234, the rear rod support assembly 226 also positions the seal retainer and seal base away from the interior surface 218 of the internal chamber 216 advantageously avoiding surface contact between these components.

To facilitate the back-and-forth movement of the rear rod support assembly 226 through the internal chamber 216 of the housing 206, the low-friction bushing 236 provides a relatively low coefficient of friction between the surface of the low-friction bushing and the interior surface 218 of the internal chamber 216 of the housing. In some examples, a coefficient of friction of about 0.05 to about 0.30 (e.g., about 0.05 to about 0.20, about 0.10 to about 0.30) may be sufficient to provide a sufficiently slippery surface for a flush cycle of the sediment filtration system. Any material that can provide a suitable coefficient of friction may be used for the low-friction bushing 236. In some examples, the low-friction bushing 236 may be formed of a wear-resistant material (e.g., a material having wear-resistant properties). In some examples, the low-friction bushing 236 may be formed of a self-lubricating material (e.g., a material having self-lubricating properties). In some examples, the low-friction bushing may be formed a material having both wear-resistant and self-lubricating properties such as, for example, polytetrafluoroethylene (PTFE). In some examples, the low-friction bushing 236 may be formed of a PTFE material including, for example, a fiber-impregnated PTFE material, a reinforced PTFE material, a filled PTFE material, and the like. The material used for the low-friction busing 236 may depend on the application of the sediment filtration system. In some examples, the low-friction bushing 236 may be formed from a material that is compliant with, satisfies, or is deemed to satisfy one or more regulations and/or requirements of the United States Food and Drug Administration ("FDA compliant") or any other government or non-government regulations and/or requirements (e.g., regulations/requirements related to the safety, quality, cleanliness, etc. of any substance such as food, water, or other substance consumed by, applied to, or otherwise exposed to humans, animals, the environment, etc.). In some examples, the low-friction bushing 236 may be formed from a self-lubricating material. In some examples, the low-friction bushing 236 may be formed from a material deemed to be compatible with drinking water. In some examples, the low-friction bushing may be formed from a material deemed to be safe for contact with food and/or drinking water. In some examples suitable materials for the low-friction bushing 236 may include RULON® 641 available from TriStar Plastics Corp. of Shrewsbury, Massachusetts, United States of America. In some examples, the low-friction bushing 236 may be formed from a material having the following physical, mechanical, and thermal properties as determined by standardized test methods (e.g., American Society for Testing and Materials (ASTM) D792, D2240, D570, D4894, D695, D790, D621, D2214, D635): a specific gravity of about 2.20, a hardness between about 60 Shore D and about 70 Shore D, a water absorption of 0% over 24 hours, a tensile strength of about 13.8 megapascals (MPa), an elongation of about 175%, a tensile modulus of about 0.24 GPa, compressive stress at 1% strain of about 4.6 MPa, a compressive modulus of about 0.48 GPa, a flexural stress at 1% strain of about 4.2 MPa, a flexural modulus of about 0.41 GPa, a deformation under load at 1,500 psi and room temperature of about 4.0%, a thermal conductivity of about 0.37 W/m.° C. It will be appreciated that the example properties disclosed herein are provided as examples and without limitation and that the low-friction bushing may be formed of alternative materials having alternative physical, mechanical, and thermal properties depending on the particular application and use case for the hydraulic damper. For example, other types of non-FDA rated plastics may be used in some implementations and molybdenum-impregnated materials, plated materials, coated materials, etc. may be used in other implementations. The rear rod support assembly is discussed further below with reference to FIGS. 4A and 4B. The seal base is discussed further below with reference to FIGS. 5A and 5B. The seal retainer is discussed further below with reference to FIGS. 6A and 6B.

As seen in FIG. 2B, a sealing mechanism 238 is positioned between the seal retainer 232 and the seal base 234 in this example. The sealing mechanism 238 is configured to prevent fluid that enters the hydraulic damper via the tube connector 208 from entering the internal chamber 216 of the housing 206. The sealing mechanism 238 may be, for example, an annular "U-cup" seal. The sealing mechanism 238 may be made of a rubber or rubber-like material such as, for example, ethylene propylene diene monomer (EPDM) rubber.

The front rod support assembly 224, in this example, includes a rod guide 240, a low-friction bushing 242, and a bushing cap 244. As seen in FIG. 2B, the low-friction bushing 242 and the bushing cap 244 are retained within the rod guide 240. As also seen in FIG. 2B, a portion of the tip 212 is retained within the rod guide 240. The rod guide 240, low-friction bushing 242, and bushing cap 244, in this example, have a generally annular (ring-like) shape. Each of the rod guide 240, low-friction bushing 242, and bushing cap 244, in this example, likewise include a central aperture (e.g., a generally circular aperture) that the forward end 228 of the rod 220 extends through when the hydraulic damper 200 is in its assembled configuration. The rod guide 240 may be a threaded component that allows it to mechanically couple to the interior surface 218 of the housing 206. For example, an outer surface of the rod guide 240 may include threads that mechanically engage with threads formed on the interior surface 218 of the housing 206 at the forward end 202 of the hydraulic damper 200. The rod guide, therefore, may be screwed on to the forward end of the hydraulic damper in some examples. As described in further detail below with reference to FIG. 7A, the bushing cap 244 secures the low-friction bushing 242 in the rod guide 240. The bushing cap 244 may be formed from any suitable material including, for example, stainless steel.

As seen in FIG. 2B, the low-friction bushing 242 is in contact with outer surface of the rod 220 (e.g., the forward end 228 of the rod). The inner diameter of the low-friction bushing 242, therefore, is sufficient to maintain contact with the outer surface of the rod 220 while again allowing freedom of movement sufficient for driving the cleaning armature of the sediment filtration system during a flush cycle. In this regard, the inner diameter of the low-friction bushing 242 may be about the same as (e.g., within a threshold tolerance of) the outer diameter of the rod 220. In some examples, suitable tolerances may be between about 1-10 thousandths of an inch (about 0.001 to about 0.003 in., about 0.005 to about 0.010 in.). To facilitate the back-and-forth movement of the rod 220 through the rod guide 240, the low-friction bushing 242 likewise provides a relatively low coefficient of friction between the surface of the low-friction bushing and the surface of the rod. As noted above, in some examples, a coefficient of friction of about 0.05 to about 0.30 (e.g., about 0.05 to about 0.20, about 0.10 to about 0.30) may be sufficient to provide a sufficiently slippery surface for a flush cycle of the sediment filtration system. The various materials provided above for the low-friction bushing 236 also may be used for the low-friction bushing 242. In some examples, the low-friction bushing 236 and 242 may be formed of the same material. In some examples, the low-friction bushing 236 and 242 may be formed of different materials. For example, the low-friction bushing 236 may be formed of a first type of material having a first coefficient of friction, and the low-friction bushing 242 may be formed of a second type of material, different from the first material, having a second coefficient of friction, different from the first coefficient of friction. In one example, the low-friction bushings of a rod support may have different dimensions resulting in different total surfaces areas being in respective contact with the interior surface of the housing and with the rod. The low-friction bushing having relative more contact surface area may be formed of a material having a relatively lower coefficient of friction to better overcome the relatively higher friction forces occurring at those contact surfaces whereas the low-friction bushing having relatively less contact surface area may be formed of a material having a relatively higher coefficient of friction sufficient to overcome the relatively lower friction forces occurring at those contact surfaces.

The configuration of the rod support 222, in this example, thus results in the rear rod support assembly 226 and rod 220 moving linearly through the internal chamber 216 of the housing 206 during a flush cycle while the front rod support assembly 224 remains fixed in place. The slippery surfaces provided by the low-friction bushings 236 and 242 facilitate smooth, steady, and reliable linear movement of the rear rod support assembly 226 and rod 220. The slippery surfaces provided by the low-friction bushings 236 and 242 also facilitate driving of the rod 220 based on the fluid pressure at the sediment filtration system as described herein. By relying on the fluid pressure of the sediment filtration system to drive the back-and-forth movement of rod 220, the hydraulic damper 200 enables the sediment filtration system to clean itself.

As also seen in FIG. 2B, the hydraulic damper 200, in this example, also includes sealing mechanisms 246 and 248 at the front rod support assembly. The sealing mechanism 246, in this example, is positioned at the rear end of the front rod support assembly 224 near the bushing cap 244. The sealing mechanism 246 may be, for example, an O-ring. The sealing mechanism 248, in this example, is retained within the rod guide between the low-friction bushing 242 and the tip 212. The sealing mechanism 248 is configured to prevent fluid from the housing of the sediment filtration system (e.g., the flush chamber) from entering the internal chamber 216 of the housing 206 as the rod 220 moves back-and-forth during a flush cycle. The sealing mechanism 248 may be, for example, an annular "U-cup" seal. The sealing mechanism 248 likewise may be made of a rubber or rubber-like material (e.g., EDPM rubber).

One example hydraulic damper as disclosed herein thus includes a housing defining an internal chamber, a fluid-drivable rod and a rod support disposed within the internal chamber of the housing, and a tip mounted to an end of the rod. The rod includes a shaft extending between opposite ends of the rod. The rod also includes a region configured to support a low-friction bushing disposed on the rod (a bushing support region). A diameter of the bushing support region of the rod is less than the diameter of the shaft of the rod. The rod support is configured to support the rod within the internal chamber of the housing and to facilitate movement of the rod between a retracted position and an extended position. The rod support includes a movable rod support assembly and a stationary rod support assembly. The movable rod support assembly is configured to support the end of the rod having the bushing support region within the housing and to move with the hydraulic damper between the retracted position and the extended position. The movable rod support assembly includes a low-friction bushing, a seal base, a seal, and a seal retainer. The low-friction bushing is disposed on the bushing support region of the rod with the rod being received through a central aperture of the low-friction bushing. An outer surface of the low-friction bushing is in surface contact with an interior surface of the internal chamber of the housing. The seal base is disposed on the end of the rod adjacent to the low-friction bushing with the rod being received through a central aperture of the seal base. The seal base is configured to retain the low-friction bushing on the bushing support region of the rod. The seal base includes a seal support region and a flange. An outer diameter of the seal support region is less than an outer diameter of the flange. The outer diameter of the flange is less than the outer diameter of the adjacent low-friction bushing. The seal is disposed on the seal support region of the seal base with the seal support region being received through a central aperture of the seal. The seal retainer is disposed on the end of the rod adjacent to the seal base with the rod being received through a central aperture of the seal retainer. The seal retainer is configured to retain the seal on the seal support region of the seal base. The stationary rod support assembly is configured to support the opposite end of the rod with the internal chamber of the housing. The stationary rod support assembly is configured to remain stationary within the internal chamber of the housing during movement of the hydraulic damper between the retracted position and the extended position. The stationary rod support assembly includes a rod guide, another low-friction bushing, a bushing cap, and another seal. The rod guide is configured to mount to the interior surface of the internal chamber of the housing with the rod being received through a central aperture of the rod guide without any surface contact between the outer surface of the rod and an interior surface of the rod guide. The interior surface of the rod guide may define a bushing receiving region, a bushing cap receiving region, a seal receiving region, and a tip receiving region. An inner diameter of the bushing receiving region and an inner diameter of the seal receiving region are larger than an inner diameter of the bushing receiving region. The inner diameter of the bushing receiving region and the inner diameter of the seal receiving region also are larger than an inner diameter of the tip receiving region. The low-friction bushing is disposed within the bushing receiving region of the rod guide with the rod being received through a central aperture of the bushing cap. The outer surface of the rod is in surface contact with an interior surface of the low-friction bushing disposed within the rod guide. The bushing cap is disposed within the bushing cap receiving region of the rod guide with the rod being received through a central aperture of he bushing cap. The bushing cap is configured to retain the low-friction bushing within the bushing receiving region of the rod guide. The seal is disposed within the seal receiving region of the rod guide with the rod being received through a central aperture of the seal. The tip is mounted to the end of the rod. The tip is configured to be at least partially received within the tip receiving region of the rod guide during movement of the rod toward the retracted position. It will be appreciated that the example hydraulic damper described above is just one implementation of a hydraulic damper according to the disclosures herein and that other example hydraulic dampers may have additional or alternative elements, features, characteristics, properties, and the like in according to the present disclosures.

Figure 3A:
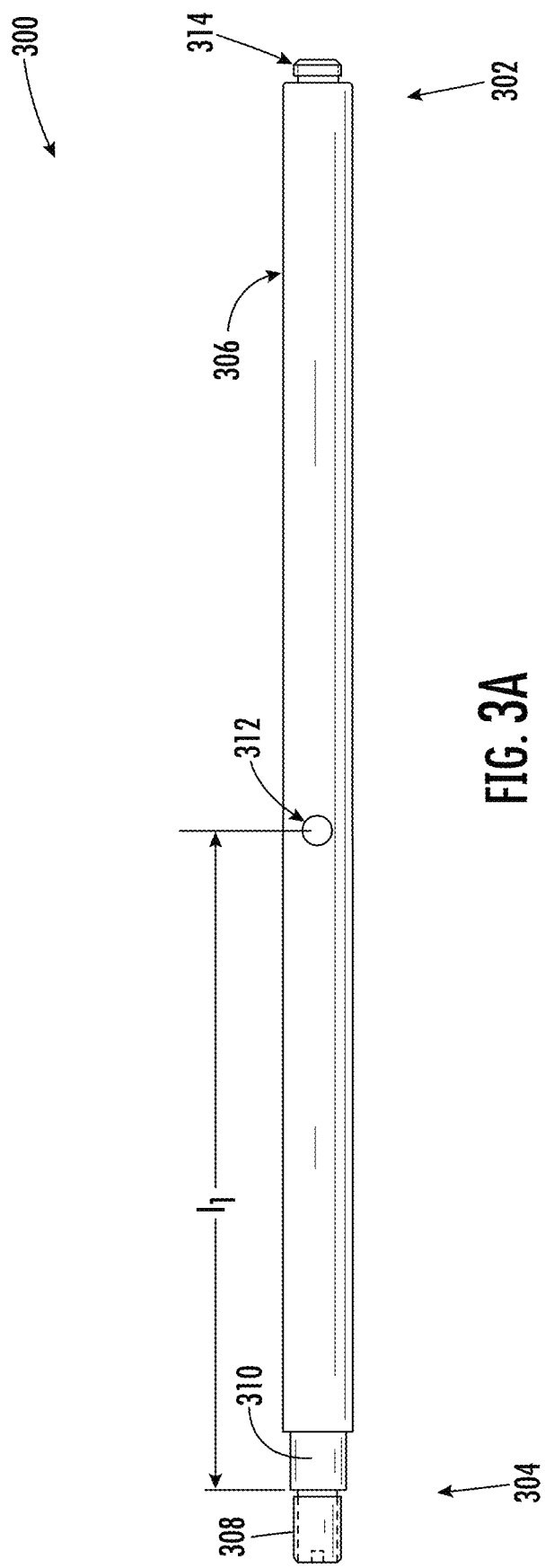
FIG. 3A depicts a top view of an example rod according to various aspects described herein.
Figure 3B:
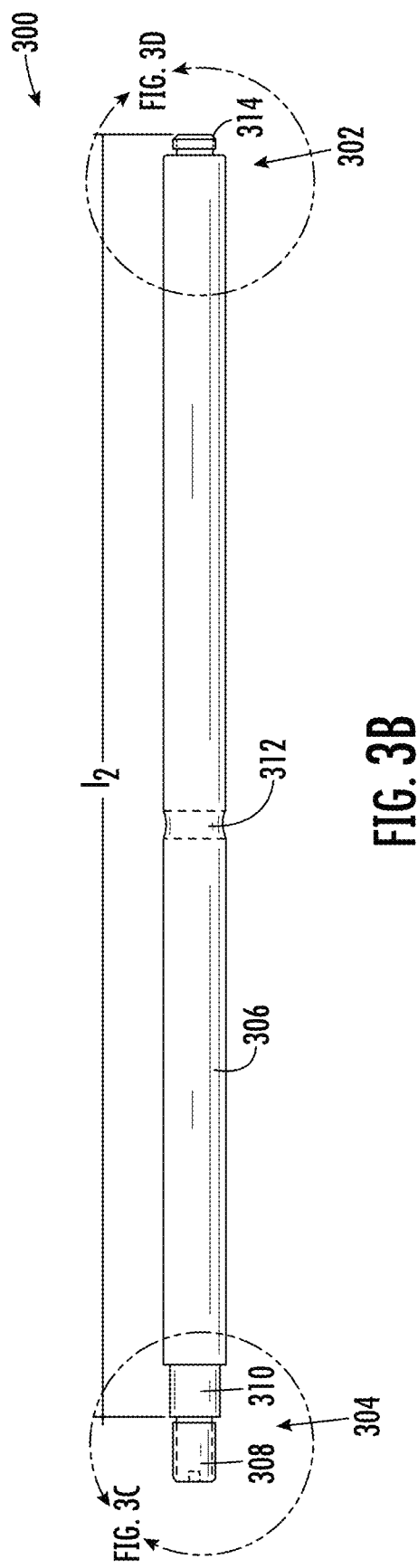
FIG. 3B depicts a side view of the rod of FIG. 3A.
Figure 3D:
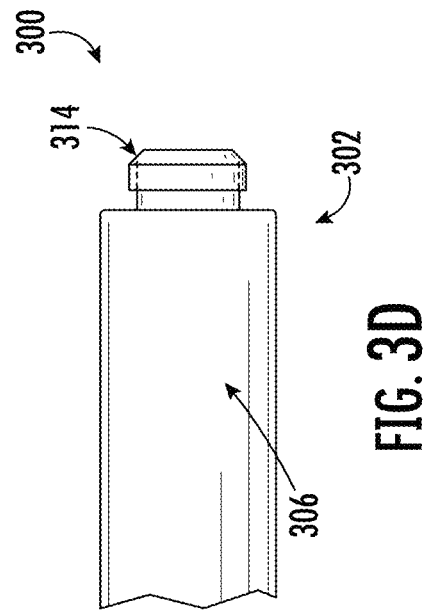
FIG. 3D depicts a close-up side view of a second end of the rod of FIG. 3A.
Figure 3C:
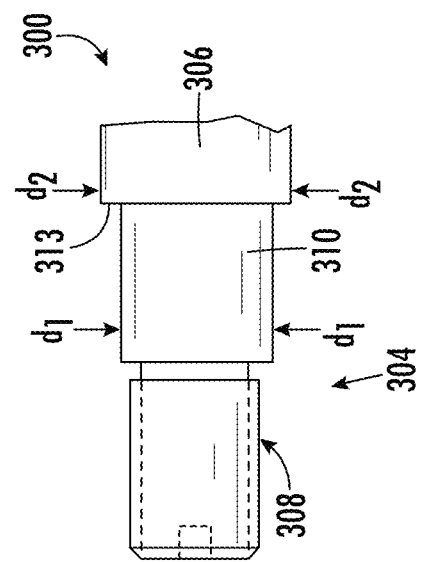
FIG. 3C depicts a close-up side view of a first end of the rod of FIG. 3A.

FIGS. 3A and 3B respectively depict a top view and a side view of an example rod 300 according to various aspects described herein. FIG. 3B indicates two close-up views (dashed circles labeled "FIG. 3C" and "FIG. 3D") of the respective ends of the rod 300. FIG. 3C depicts a close-up view of a first end of the rod 300 of FIG. 3A (View A). FIG. 3D depicts a close-up view of a second end of the rod 300 of FIG. 3A (View B). The rod 300, in this example, likewise includes a forward end 302 closer to the sediment filtration system and a rear end 304 farther from the sediment filtration system with a shaft 306 extending between the forward end and the rear end of the rod. The rod 300, in this example, also includes a seal attachment head 308, a bushing support region 310, a receiver 312 for an position indicator pin, and a hydraulic damper tip attachment head 314 (or simply tip attachment head). The seal attachment head 308 is configured to be received within and retained by (e.g., via threads) the seal retainer and seal base (e.g., seal retainer 232 and seal base 234) of the rear rod support assembly (e.g., rear rod support assembly 226). In the example where the seal attachment head includes threads, it may be referred to as a threaded seal attachment head. The bushing support region 310 is configured to be received within and support the low-friction bushing (e.g., low-friction bushing 236) of the rear rod support assembly (e.g., rear rod support assembly 226). The receiver 312 is configured to facilitate receipt of a position indicator pin that indicates of the position of the rod 300 as it moves back and forth during a flush cycle. The receiver 312, in this example, includes a radial aperture through the shaft 306 of the rod 300. The receiver 312 may receive and retain (e.g., via threads, interference fit, or other retaining mechanism) a position indicator pin (not shown) within the radial aperture. The indicator pin may extend through an axial slot of the housing of the hydraulic damper and axially move along the length of the hydraulic damper as the rod moves back and forth during a flush cycle. In this way, the hydraulic damper provides a visual indication of the axial position of the rod during operation of the sediment filtration system. The receiver 312 may be located an axial length ($l_1$) away from a rear end of the bushing support region 310 as shown by way of example in FIG. 3A. The axial location of the receiver 312 may be equal, about equal, or correspond to the stroke length of the hydraulic damper. In some examples, the stroke length of the hydraulic damper may be between about 3 inches to about 8 inches. In some examples, the receiver 312 may be located about halfway along the axial length of the rod (e.g., $l_1$=7.125 in.). The rod 300 may have a length ($l_2$) measured from a rear end of the bushing support region 310 to a forward end of the tip attachment head. In some examples, the length ($l_2$) may be between about 15 inches to about 16 inches (e.g., about 15.445 in.).

FIG. 3C shows a close up view of the rear end 304 of the rod 300, which includes the bushing support region 310. The dimensions of the bushing support region 310 may be configured such that the bushing support region can be received through the central aperture of the low-friction bushing of the rear rod support assembly (e.g., low-friction bushing 236 of rear support assembly 226). For example, the diameter ($d_1$) of the bushing support region 310 may be about the same as (e.g., within a threshold tolerance of) the inner diameter of the low-friction bushing. As seen in FIG. 3C, the diameter ($d_2$) of the shaft 306 of the rod 300 may be greater than the diameter ($d_1$) of the bushing support region 310 (i.e., $d_2>d_1$). This differential in the diameters of the rod 300 results in a step 313 where the shaft 306 transitions to the bushing support region 310. The inner diameter of the low-friction bushing likewise may be less than the diameter ($d_2$) of the shaft 306 of the rod 300. The step 313 thus provides a surface that abuts the low-friction bushing when the hydraulic damper is in its assembled configuration. Attaching the seal retainer and seal base to the rear end 304 of the rod 300 may compress the low-friction bushing against the step 313 holding it in place in a constrained fashion and preventing the low-friction bushing from spinning around the rod. Constraining rotational motion may further limit wear on the bushing and the interior surface of the housing of the hydraulic damper.

FIG. 3D shows a close-up view of the forward end 302 of the rod 300, which includes the tip attachment head 314. The tip attachment head 314 is configured to receive and retain the tip (e.g., tip 212). The tip may be configured to mechanically couple to the tip attachment head 314. For example, the outer surface of the tip attachment head may include threads that mechanically engage with threads formed on an interior surface of the tip. In the example where the tip attachment head includes threads, it may be referred to as a threaded tip attachment head. The tip will be discussed in further detail below with reference to FIGS. 8A-B.

Figure 4B:
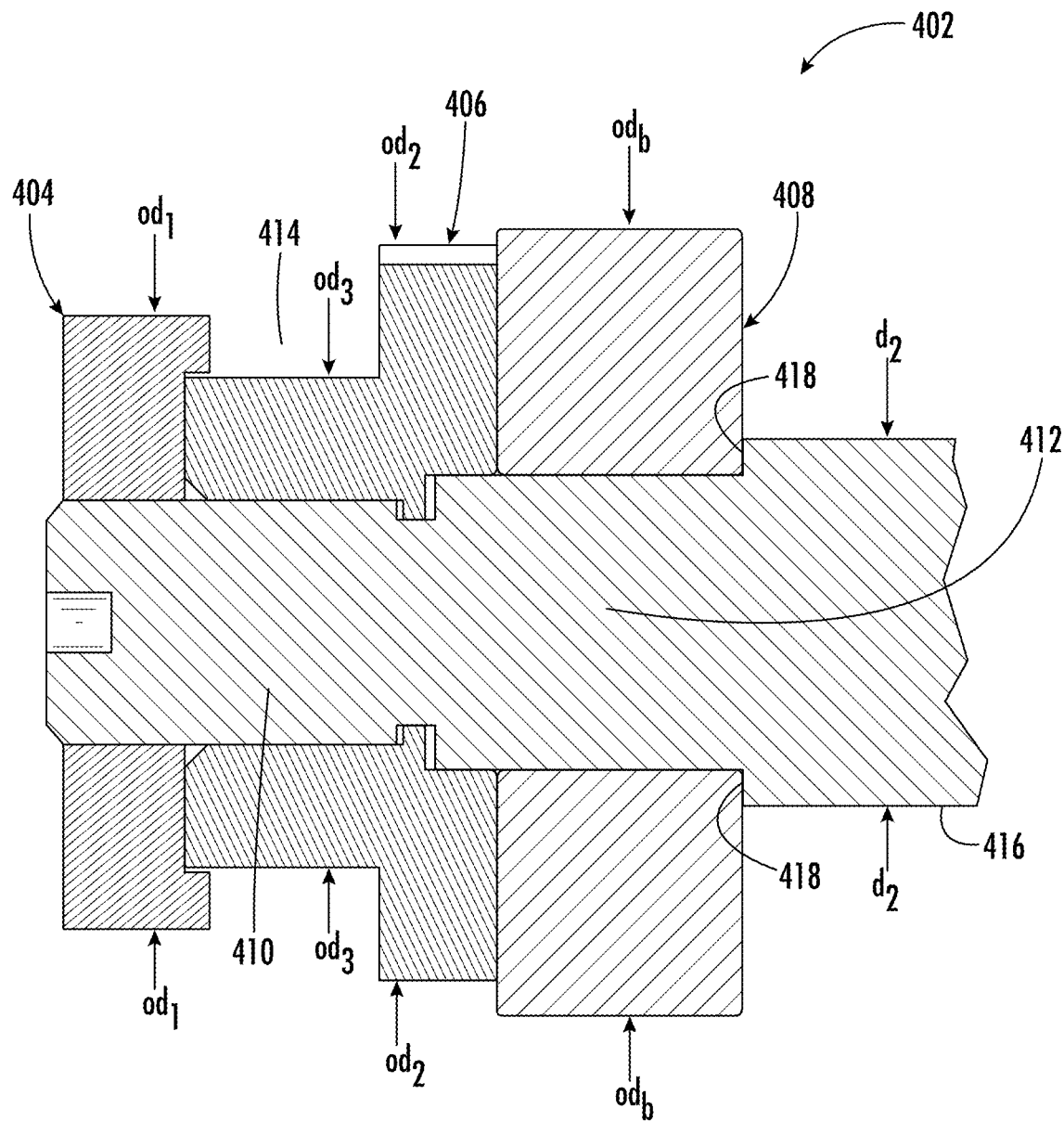
FIG. 4B depicts a close-up side cross-sectional view of the rear rod support assembly of FIG. 4A in an assembled configuration.

FIG. 4A depicts a side cross-sectional view of an example rod 400 and an example rear rod support assembly 402 in an assembled configuration according to various aspects described herein. FIG. 4A indicates a close-up view (dashed circle labeled "FIG. 4B") of the rear rod support assembly 402. FIG. 4B depicts the close-up view of the rear rod support assembly 402. As described above, the rear rod support assembly 402 includes a seal retainer 404, a seal base 406, and a low-friction bushing 408. As seen in FIGS. 4A-B, the seal attachment head 410 of the rod 400 is received and retained within the respective central apertures of the seal retainer 404 and the seal base 406. As also seen in FIGS. 4A-B, the bushing support region 412 of the rod 400 is received with the central aperture of the low-friction bushing 408. As seen in FIG. 4B, the outer diameter ($od_b$) of the low-friction bushing 408 is greater than the outer diameter ($od_{1a}$) of the seal retainer 404, which is greater than the maximum outer diameter ($od_2$) of the seal base 406 (i.e., $od_b>od_{1a}$ and $od_b>od_2$). As described herein, the differential in these diameters $od_b$, $od_{1a}$, and $od_2$ positions the seal retainer 404 and seal base 406 away from the interior surface of the housing with only the low-friction bushing having any surface contact with the interior surface of the housing. As also seen in FIG. 4B, the outer diameter of the seal retainer 404 ($od_{1a}$) is greater than the minimum outer diameter ($od_3$) of the seal base 406 (i.e., $od_{1a}>od_3$). The differential in these diameters $od_{1a}$ and $od_3$ defines a channel 414 (e.g., an annular channel) around the ear rod support assembly 402. A sealing mechanism (e.g., sealing mechanism 238 such as a "U"-cup seal) may be installed in the channel 414 as described herein. As also described herein, the diameter ($d_2$) of the shaft 416 of the rod 400 may be greater than the diameter ($d_1$ in FIG. 3C) of the bushing support region resulting in a step 418 that the low-friction bushing 408 is pressed against when the seal retainer 404 and seal base 406 are installed at (e.g., threaded onto) the seal attachment head 410. As further seen in FIG. 4B and as described in further detail below with reference to FIGS. 5 and 6, a portion of the rear end of the seal base 406 is received within a relatively shallow cavity defined in the forward end of the seal retainer 404. The sealing force on the sealing mechanism pushes it toward the seal base 406. The diameter of the seal base 406 is configured (e.g., maximized) to provide a sufficient (e.g., maximum) surface area for the sealing mechanism to interact with, which reduces (e.g., minimizes) the opportunity for the sealing mechanism to become dislodged. In some examples, the sealing mechanism may be configured such that the seal base 406 does not bottom-out on the threads and become tight. Instead, the sealing mechanism compresses the low-friction bushing 408 to constrain its motion. The force between the seal retainer 404 and the seal base 406 applies a lateral motion on the threads and reduces friction between the seal retainer and the seal base, which reduces the likelihood that the seal retainer and seal base do not loosen over time.

Figure 5A:
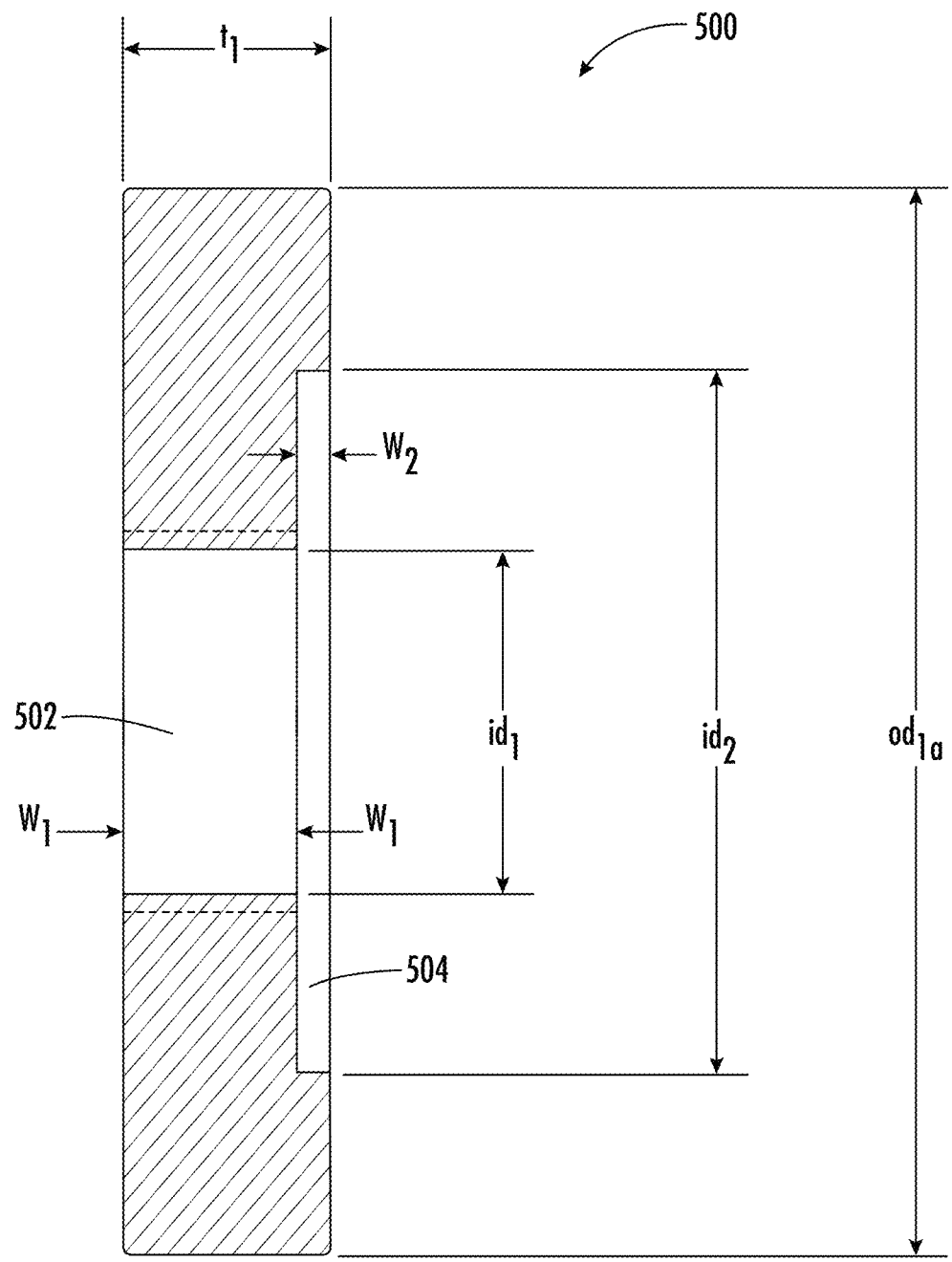
FIG. 5A depicts a side cross-sectional view of an example seal retainer of a rear rod support assembly according to various aspects described herein.
Figure 5B:
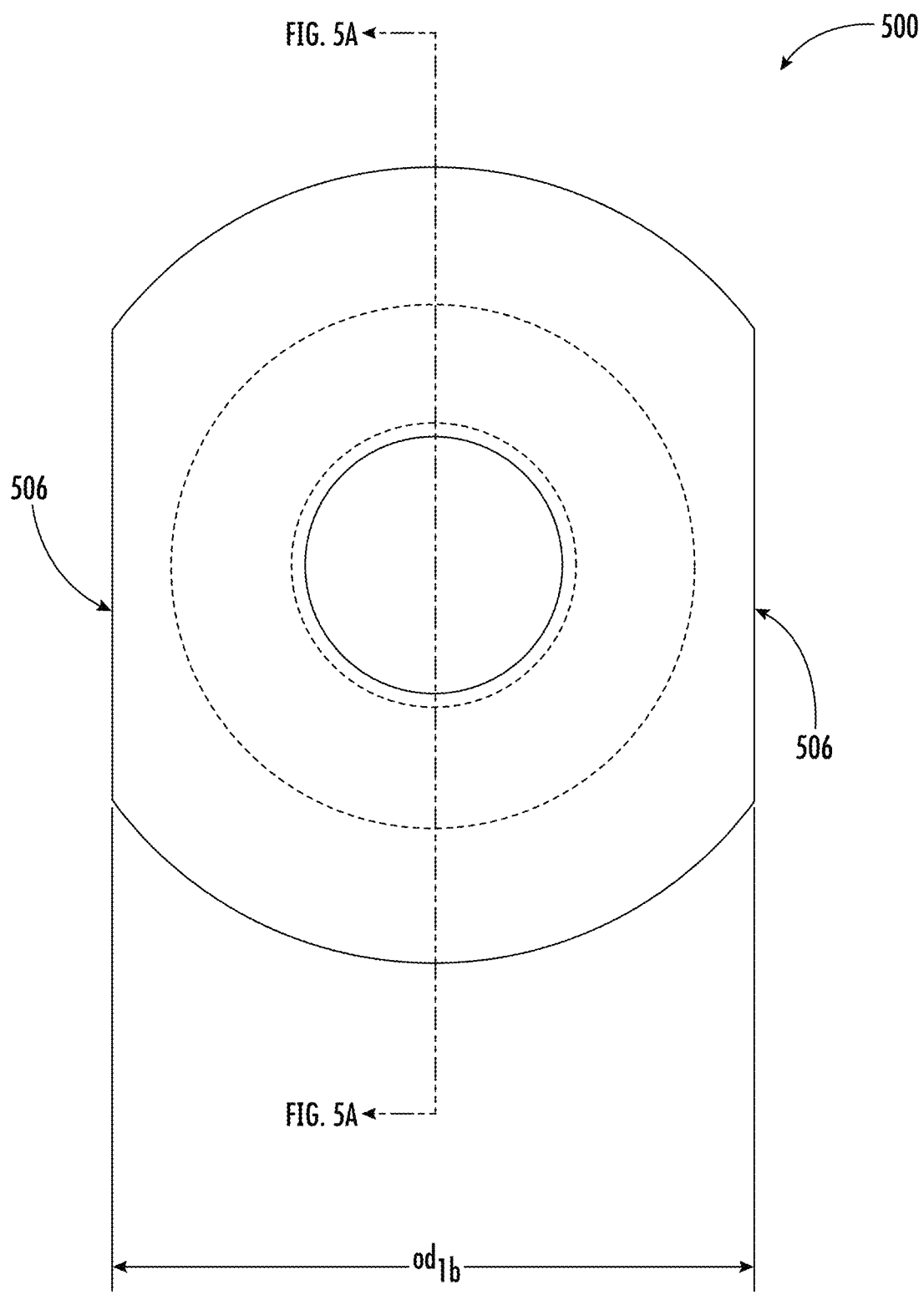
FIG. 5B depicts a front view of the seal retainer of FIG. 5A.

FIG. 5A depicts a side-cross sectional view of an example seal retainer 500 of a rear rod support assembly according to various aspects described herein. FIG. 5B depicts a front view of the example seal retainer 500. The cross-sectional view shown in FIG. 5A is along dashed line labeled "FIG. 5A" of FIG. 5B. As described herein and as seen in FIG. 5A, the seal retainer 500, in this example, is configured to receive an end of the rod (e.g., rear end 230 of rod 220) and, in particular, configured to receive the seal attachment head (e.g., seal attachment head 410 of rod 400). The seal retainer 500, in this example, thus defines a cavity 502 that is sized and shaped to receive an end of the rod. As also described herein, the seal retainer 500 may be configured to mount to the end of the rod using, for example, threads respectively formed on an outer surface of the rod and an interior surface of the seal retainer within the cavity 502.

Figure 6A:
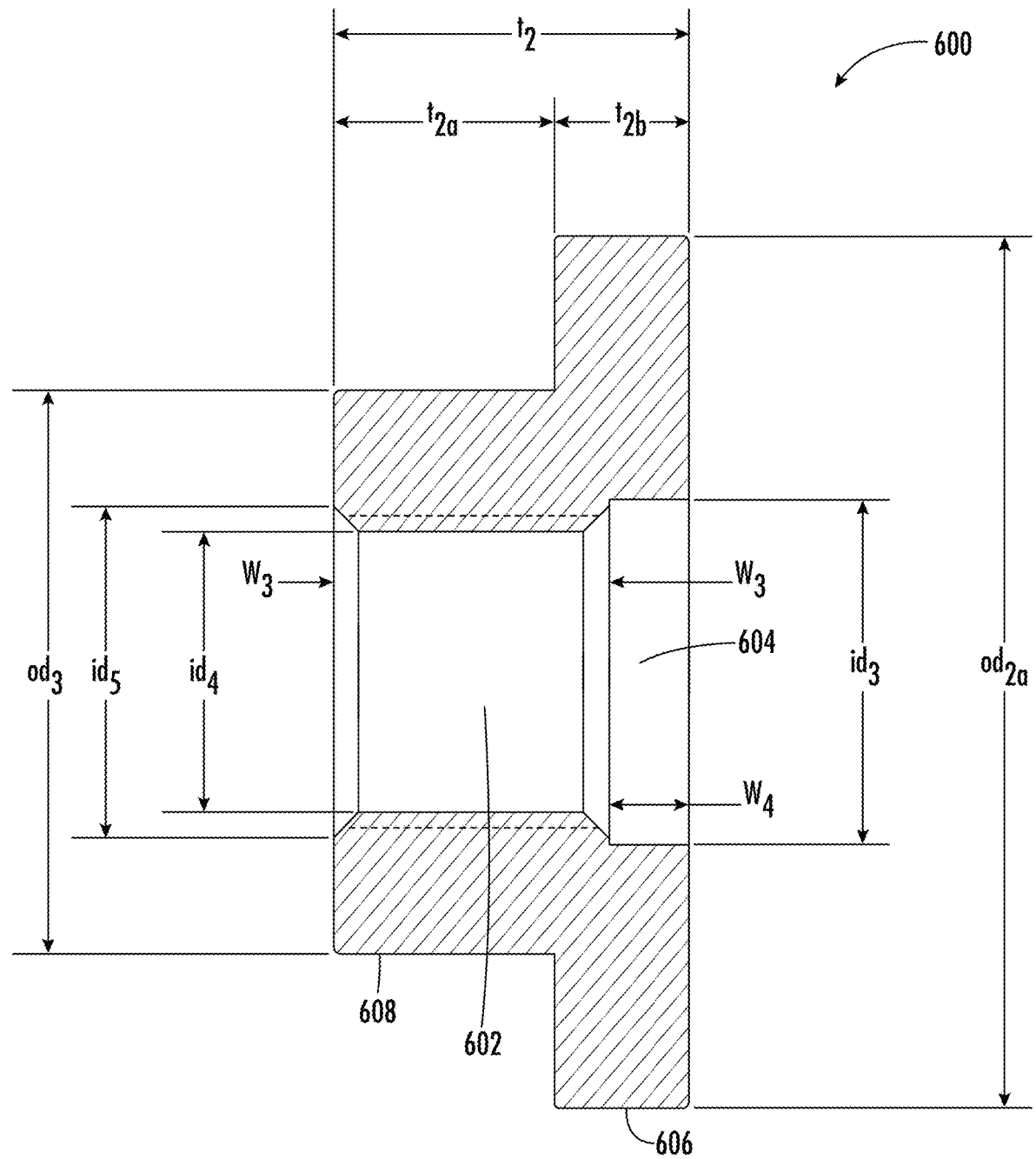
FIG. 6A depicts a side cross-sectional view of an example seal base of a rear rod support assembly according to various aspects described herein.
Figure 6B:
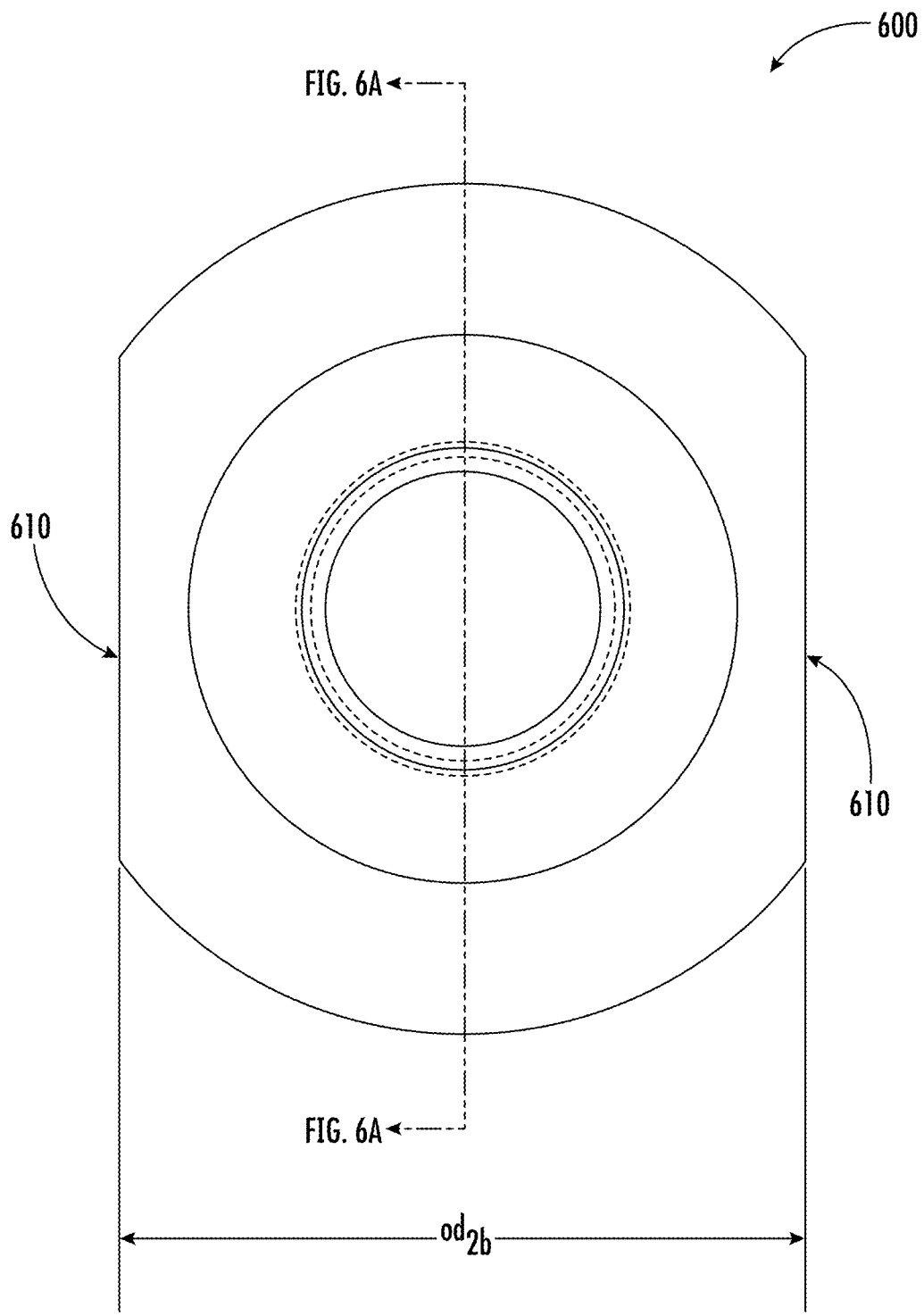
FIG. 6B depicts a front view of the seal base of FIG. 6A.

The seal retainer 500, in this example, also is configured to receive an end (e.g., a rear end) of the seal base (e.g., seal base 234, seal base 406, or seal base 600 in FIGS. 6A and 6B). The seal retainer 500, in this example, thus also defines a cavity 504 that is sized and shaped to receive an end of the seal base. The receipt of an end of a seal base within this cavity of a seal retainer is depicted by way of example in FIGS. 2B and 4A-B.

FIG. 5A also indicates various dimensions of the seal retainer 500. For example, the seal retainer 500 has an axial thickness ($t_1$) measured between its respective ends (e.g., its rear end and its forward end). The cavity 502 has an axial width ($w_1$), and the cavity 504 has an axial width ($w_2$), which may sum to about the same axial thickness of the seal retainer 500 (e.g., $w_1 + w_2 = t_1$). The seal retainer 500, in this example, also has an outer diameter ($od_{1a}$) and two inner diameters ($id_1$ and $id_2$), the inner diameters being respectively defined by the cavity 502 and the cavity 504. The inner diameter ($id_1$) defined by the cavity 502 may be about the same as the outer diameter of the seal attachment head of the rod (e.g., seal attachment head 410 of rod 400) or otherwise sufficient to facilitate mounting the seal retainer 500 on an end of the rod. The inner diameter ($id_2$) defined by the cavity 504 may be about the same as the outer diameter of the end of the seal base (e.g., seal base 234, seal base 406, or seal base 600 in FIG. 6A.) or otherwise sufficient to facilitate receipt of the end of the seal base within the cavity. The inner diameter ($id_1$) defined by the cavity 502 thus may be smaller than the inner diameter ($id_2$) defined by the cavity 504 (i.e., $id_1 < id_2$). The seal retainer 500 also may include wrench flats 506 at its outer perimeter to facilitate installation of the seal retainer at the rod using a wrench, ratchet, or other suitable tool. The seal retainer 500 thus may have an outer diameter ($od_{1b}$) at the wrench flats 506 that is less than the overall outer diameter ($od_{1a}$) of the seal retainer (i.e., $od_{1a} > od_{1b}$). The seal retainer 500 may be mounted and/or affixed to the rod in other ways (e.g., a press fit, an interference fit, and the like). The cavity 502 thus also may be referred to as a rod receiving region, a rod attachment region, a rod mounting region, and the like.

FIG. 6A depicts a side cross-sectional view of an example seal base 600 of a rear rod support assembly according to various aspects described herein. FIG. 6B depicts a front view of the example seal base 600. The cross-sectional view shown in FIG. 6A is along dashed line labeled "FIG. 6A" of FIG. 6B. As described herein and as seen in FIG. 6A, the seal base 600, in this example, also is configured to receive and end of the rod (e.g., rear end 230 of rod 220) and, in particular, configured to receive the seal attachment head (e.g., seal attachment head 410 of rod 400). The seal base 600, in this example, thus likewise defines a cavity 602 that is sized and shaped to receive an end of the rod. The seal base 600 likewise may be configured to mount to the end of the rod using, for example, threads respectively formed on an outer surface of the rod and an interior surface of the seal base within the cavity 602. The seal base 600 likewise may be mounted and/or affixed to the rod in other ways (e.g., a press fit, an interference fit, and the like). The cavity 602 thus also may be referred to as a rod receiving region, a rod attachment region, a rod mounting region, and the like.

The seal base 600, in this example also is configured to receive a portion of the bushing support region of the rod (e.g., bushing support region 310 of rod 300 or bushing support region 412 of rod 400). The seal base 600, in this example, thus also defines a cavity 604 that is sized and shaped to receive a portion of the bushing support region of the rod. The low-friction bushing (e.g., bushing 236 or bushing 408) may be compressed against the seal base 600 by tightening the seal base and or seal retainer on the rod. The receipt of the bushing support region of a rod within this cavity of a seal base is likewise depicted by way of example in FIGS. 2B and 4A-B.

As seen in FIG. 6A, the side cross-section of the seal base 600, in this example, is generally "T"-shaped. As such, the seal base 600 may be described as having a flange 606 and a neck 608 where the diameter of the flange is greater than the diameter of the neck as seen in FIG. 6A. In the seal base 600, in this example, the cavity 604 that receives the portion of the bushing support region of the rod is located in the flange 606 of the seal base and the cavity 602 that receives the seal attachment head of the rod is substantially located in the neck of the seal base. As described above, a sealing mechanism (e.g., a "U"-cup seal) may be mounted on the seal base. The sealing mechanism may be mounted, for example, on the neck 608 of the seal base 600. The neck 608 of the seal base 600 thus also may be referred to as a seal support region.

FIG. 6A also indicates various dimensions of the seal base 600. For example, the seal base has an axial thickness ($t_2$) measured between its respective ends (e.g., its read end and its forward end). Each of the neck 608 and the flange 606 of the seal base 600 has a respective axial thickness ($t_{2a}$ and $t_{2b}$), which may sum to the overall thickness ($t_2$) of the seal base (e.g., $t_{2a} + t_{2b} = t_2$). As seen in FIG. 6A, the axial thickness ($t_{2a}$) of the neck 608 is greater than the axial thickness ($t_{2b}$) of the flange 606 (i.e., $t_{2a} > t_{2b}$). The cavity 602 of the seal base 600, in this example, has an axial width ($w_3$) that is slightly larger than the axial thickness ($t_{2a}$) of the neck 608 (i.e., $w_3 > t_{2a}$). Accordingly, the cavity 604 of the seal base 600, in this example, has an axial width ($w_4$) that is slightly smaller than the axial thickness ($t_{2b}$) of the flange 606 (i.e., $w_4 < t_{2b}$). The "T"-shaped configuration of the seal base 600, in this example, results in an outer diameter ($od_2$) at the flange 606 of the seal base that is greater than the outer diameter ($od_3$) at the neck 608 of the seal base. The seal base 600, in this example, also include multiple inner diameters ($id_3$, $id_4$, and $id_5$) respectively defined by the cavities 602 and 604. For example, the inner diameter ($id_3$) defined by the cavity 604 may be about the same as the outer diameter of the bushing support region (e.g., bushing support region 310 of rod 300 or bushing support region 412 of rod 400) or otherwise sufficient to facilitate receipt of the bushing support region within the cavity. The inner diameter ($id_4$) defined by the cavity 602 may be about the same as the outer diameter of the seal attachment head of the rod (e.g., seal attachment head 410 of rod 400) or otherwise sufficient to facilitate mounting the seal base 600 on an end of the rod. As seen in FIG. 6A, the cavity 602 of the seal base 600, in this example, tapers in a direction toward a center of the seal base and thus defines a relatively larger outer diameter ($id_5$) at the rear end and the forward end of the cavity (i.e., $id_5 > id_4$). This tapering region of the seal base 600 facilitates installation of the seal base 600 at the rod (e.g., facilitates receipt of the rod within the cavity 602). The seal base 600 also may include wrench flats 610 at the outer perimeter of the flange 606 to facilitate installation of the seal base at the rod using a wrench, ratchet, or other suitable tool. The seal base 600 thus may have an outer diameter ($od_{2b}$) at the wrench flats 610 that is less than the overall outer diameter ($od_{2a}$) of the seal base (i.e., $od_{2a} > od_{2b}$).

Figure 7A:
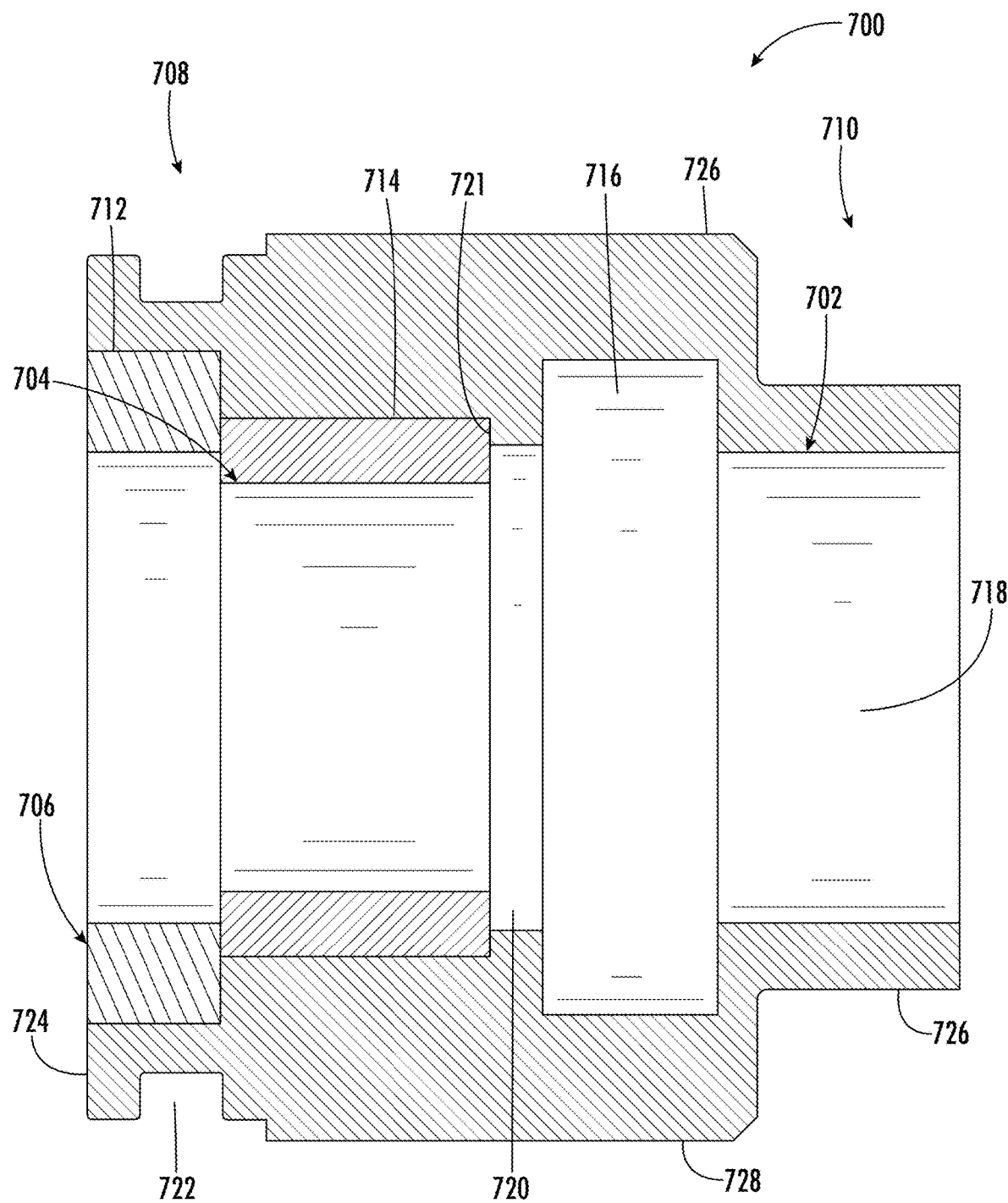
FIG. 7A depicts a side cross-sectional view of an example front rod support assembly according to various aspects described herein.
Figure 7B:
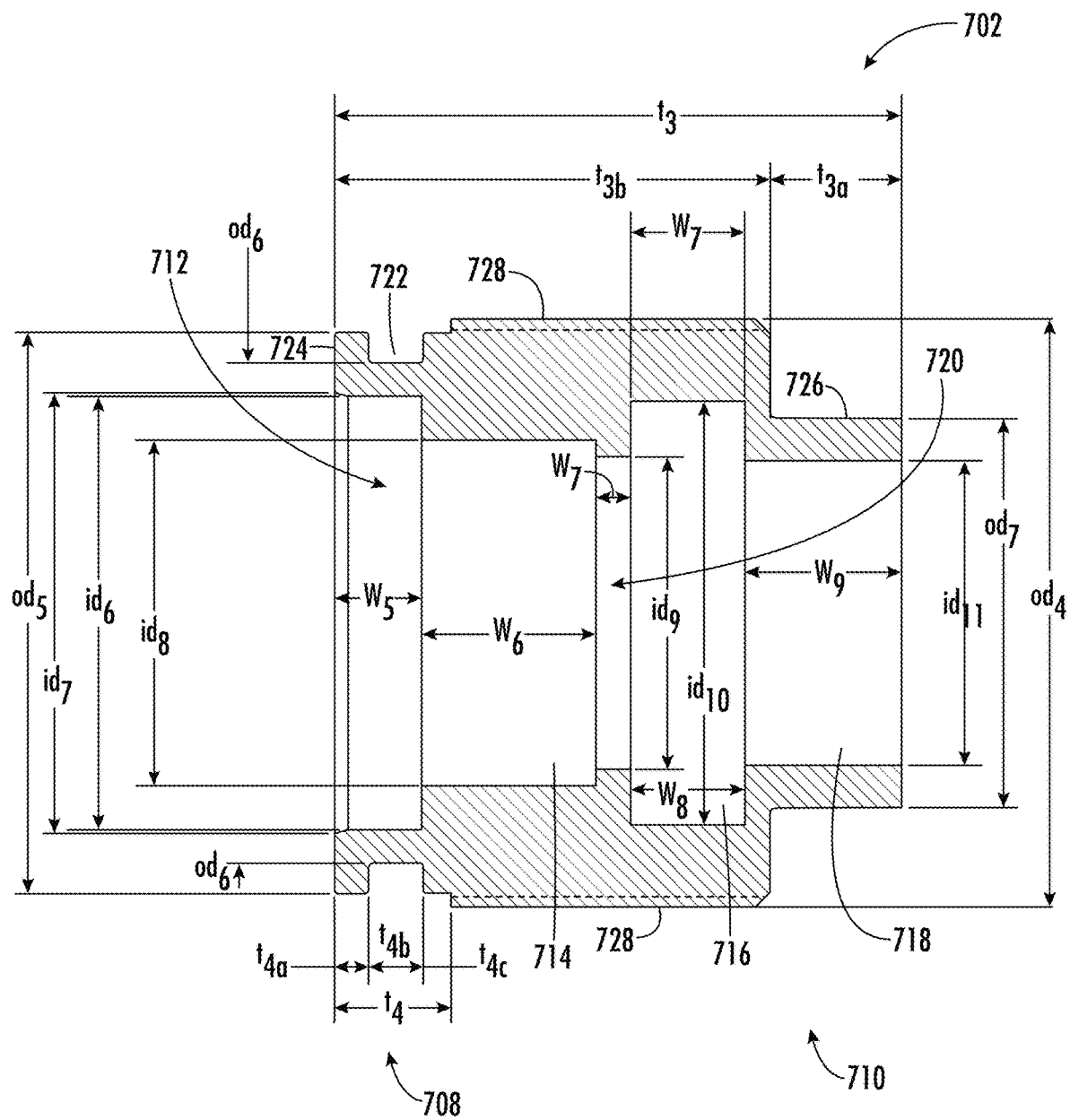
FIG. 7B depicts a side cross-sectional view of the rod guide of the front rod support assembly of FIG. 7A.

FIG. 7A depicts a side cross-sectional view of an example front rod support assembly 700 according to various aspects described herein. The front rod support assembly 700, in this example, includes a rod guide 702, a low-friction bushing 704, and a bushing cap 706. FIG. 7B depicts a side cross-sectional view of the rod guide 702. As seen in FIG. 7B, the rod guide 702 defines an aperture between a first end 708 (e.g., a rear end) and a second end 710 (e.g., a forward end) with various regions defined across the interior surface of the rod guide and with each region of the interior surface having different inner diameters between the rear end and the forward end of the rod guide. For example, the rod guide 702, in this example, includes a first region 712 that is sized and shaped to receive the busing cap 706 and thus may be referred to as a bushing cap receiving region, a second region 714 that is sized and shaped to receive the low-friction bushing 704 and thus may be referred to as a bushing receiving region, a third region 716 that is sized and shaped to receive a seal such as a "U"-cup seal and thus may be referred to as a seal receiving region, and fourth region 718 that is sized and shaped to receive the tip (e.g., tip 212 or tip 800 in FIGS. 8A-B) and thus may be referred to as a tip receiving region. The rod guide 702, in this example, also includes a spacing region 720 that provides a space or gap between the bushing receiving region 714 and the seal receiving region 716. As described further below, the inner diameter of the rod guide 702 at the bushing receiving region 714 is larger than the inner diameter of the rod guide at the spacing region 720 thus creating a step 721 between the bushing receiving region and the spacing region, which facilitates the bushing cap 706 retaining the low-friction bushing 704 within the bushing receiving region. The rod guide 702 also may be configured to retain a sealing mechanism (e.g., an O-ring) at the rear end 708 of the rod guide. As seen in FIGS. 7A-B, for example, rod guide 702 defines a channel 722 (e.g., a circumferential channel) at the rear end 708 of the rod guide. The channel 722 may retain a sealing mechanism such as an O-ring when the is in its assembled configuration and installed at a sediment filtration system. The presence of the channel 722 may result in a flange 724 at the rear end 708 of the rod guide 702. The bushing cap 706, in this example, is configured to retain the low-friction bushing 704 within the rod guide 702. The bushing cap 706 may retain the low-friction bushing 704 within the rod guide 702 by being press fit or interference fit into the bushing cap receiving region 712 of the rod guide. The rod guide 702 may be formed from any suitable material including, for example, stainless steel.

Figure 7C:
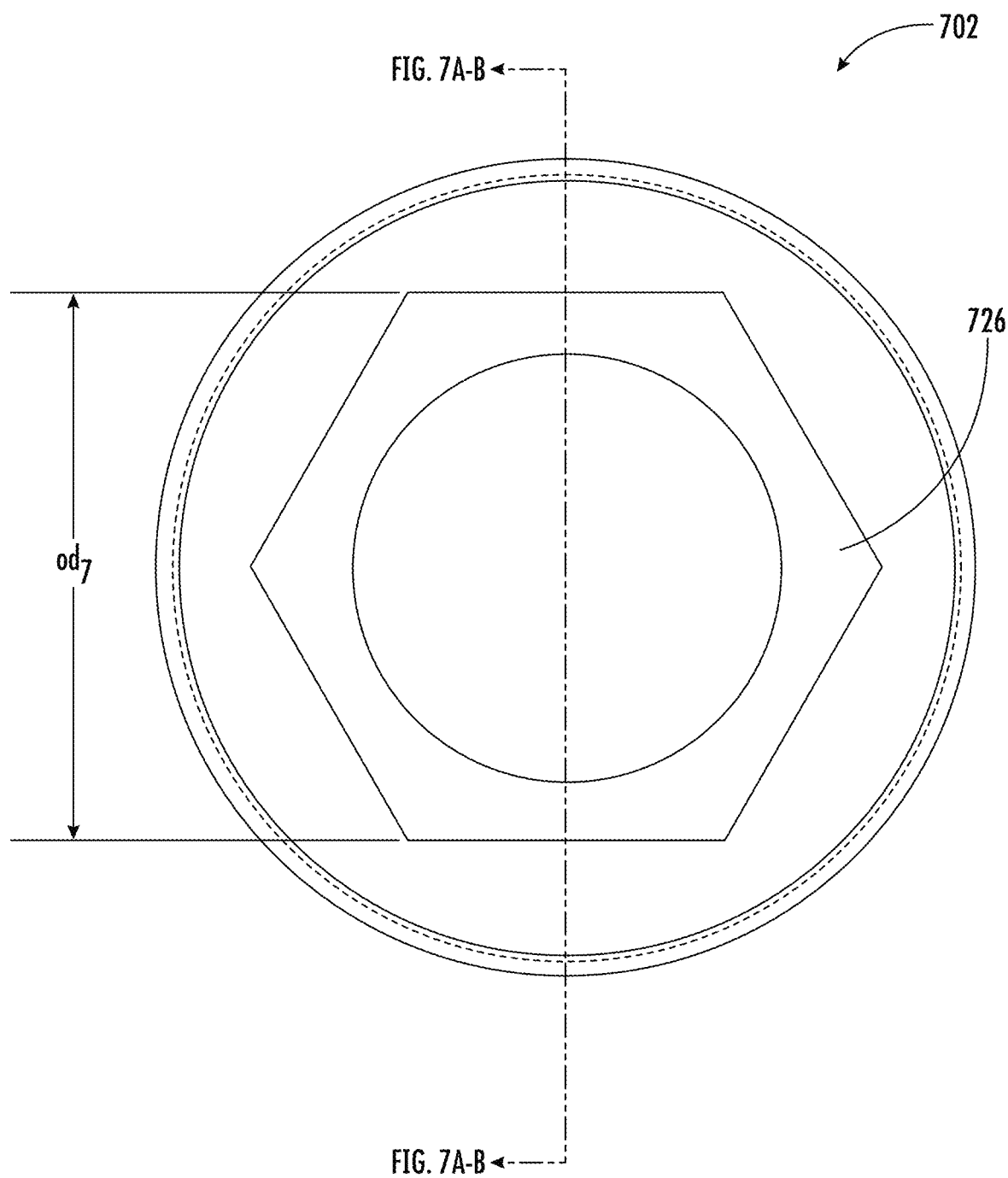
FIG. 7C depicts a front view of the rod guide of FIG. 7B.

As described further below with reference to FIG. 7B, the tip receiving region 718, in this example, is substantially located in a portion 726 of the rod guide 702 having a smaller outer diameter than the overall (maximum) outer diameter of the rod guide. This portion 726 of the rod guide 702 thus may be referred to as the neck of the rod guide. The neck 726 of the rod guide 702 also may be configured to facilitate its installation at the. As seen in FIG. 7C, the perimeter of neck 726 of the rod guide 702, in this example, has a hexagonal shape resembling the head of a hex bolt, which facilitates installation of the rod guide 702 at the hydraulic damper using a wrench, ratchet, or other suitable tool. The cross-sectional views of the rod guide 702 in FIGS. 7A-B are along dashed line labeled "FIGS. 7A-B" as depicted in FIG. 7C.

As described herein, the front rod support assembly is configured to remain stationary in the housing when the hydraulic damper is in its assembled configuration. The front rod support assembly thus may include features to secure it to the housing. For example, the outer surface of the rod guide 702 of the front rod support assembly 700 includes a threaded region 728 having threads that engage with corresponding threads formed on the interior surface of the housing at the front end of the hydraulic damper (e.g., interior surface 218 of housing 206 at the forward end 202 of hydraulic damper 200). The front rod support assembly 700, in this example, thus may be screwed into the front end of the hydraulic damper. It will be appreciated that a front rod support assembly may include alternative features to secure it to the housing in other examples.

FIG. 7B also indicates various dimensions of the rod guide 702. For example, the rod guide 702 has an axial thickness ($t_3$) measured between its respective ends (e.g., its rear end and its forward end), which may be the sum of the various regions of the rod guide including, the axial width ($w_5$) of the bushing cap receiving region 712 which may be about the same as the axial width of the bushing cap 706, the width ($w_6$) of the bushing receiving region 714 which may be about the same as the axial width of the bushing 704, the width ($w_7$) of the spacing region 720, the width ($w_8$) of the seal receiving region 716 which may be about the same as the sealing mechanism, and the width ($w_9$) of the tip receiving region 718 (e.g., $t_3 = w_5 + w_6 + w_7 + w_8 + w_9$). The neck 726 of the rod guide 702 may have an axial thickness ($t_{3a}$), and the portion of the rod guide 702 that does not include the neck may be referred to as the body of the rod guide having the remainder of the axial thickness ($t_{3b}$) of the rod guide (e.g., $t3 = t_{3a} + t_{3b}$). The rod guide 702, in this example, thus may be described as having a body that includes the bushing cap receiving region 712, the bushing receiving region 714, the spacing region 720, the seal receiving region 716, and a portion of the tip receiving region 718, with the neck 726 of the rod guide including the remainder of the tip receiving region. As seen in FIG. 7B, the axial thickness ($t_4$) of a portion of the rod guide 702 at its rear end 708 may be based on the respective axial thicknesses of the flange 724 ($t_{4a}$), the surface of the channel 722 ($t_{4b}$), and the distance from an end of the channel to the threaded region 728 ($t_{4c}$) (e.g., $t_4 = t_{4a} + t_{4b} + t_{4c}$). As seen in FIG. 7B, the channel 722 of the rod guide 702, in this example, is wider than the flange 724 of the rod guide (e.g., $t_{4b} > t_{4a}$).

The overall (maximum) outer diameter ($od_4$) of the rod guide 702, in this example, may be defined by threaded region 728 of the rod guide (e.g., via the threads that extend away from the rod guide to engage the threads on the interior surface of the housing). The outer diameter ($od_5$) at the flange 724 of the rod guide 702, in this example, may be about the same as the inner diameter of the housing of the hydraulic damper (e.g., housing 206 of hydraulic damper 200). As such, the outer surface of the flange 724 of the rod guide 702 may be in contact with the interior surface of the housing (e.g., interior surface 218 of housing 206) when the hydraulic damper is in its assembled configuration. The outer diameter ($od_5$) at the flange 724 thus may be slightly smaller than the overall (maximum) outer diameter ($od_4$) of the rod guide 702 (e.g., $od_5 < od_4$). The outer diameter ($od_6$) of the rod guide 702 at the channel 722 thus may be smaller than the outer diameter ($od_5$) at the flange 724 (e.g., $od_6 < od_5$). The minimum outer diameter of the rod guide 702, in this example, may the outer diameter ($od_7$) at the neck 726 of the rod guide (e.g., $od_7 < od_4$, $od_7 < od_5$, and $od_7 < od_6$).

The rod guide 702, in this example, also has various inner diameters. The inner diameters of the various receiving regions may be about the same as the outer diameters of the components respectively received in those regions. For example, the bushing cap receiving region 712 may have an inner diameter ($id_6$) that is about the same as the outer diameter of the bushing cap 706. As seen in FIG. 7B, the bushing cap receiving region 712, in this example, tapers in a direction toward the center of the rod guide 702 and thus defines a relatively larger outer diameter ($id_7$) at the rear end of the bushing cap receiving region (i.e., $id_7 > id_6$). This tapering region of the rod guide 702 facilitates installing of the rod guide at the rod (e.g., facilitates receipt of the rod into the rod guide). As also seen in FIG. 7B, the bushing receiving region 714 has an inner diameter ($id_8$) that is smaller than the inner diameter ($id_6$) of the bushing cap receiving region 712 and larger than the inner diameter ($id_9$) of the spacing region 720 (i.e., $id_6 > id_8 > id_9$), which allows the bushing cap 706 to secure and retain the low-friction bushing 704 in the bushing receiving region. As further seen in FIG. 7B, the seal receiving region 716 has an inner diameter ($id_{10}$) that is larger than the inner diameter ($id_9$) of the spacing region and larger than the inner diameter ($id_{11}$) of the tip receiving region 718 (i.e., $id_{10} > id_9$ and $id_{10} > id_{11}$).

When assembled, the rod (not shown) of the hydraulic damper (e.g., rod 220 of hydraulic damper 200 or rod 300) extends through the cavity of the rod guide, for example, through a central aperture of the bushing cap 706 retained in the bushing cap receiving region 712, through a central aperture of the low-friction bushing 704 retained in the bushing receiving region 714, through a central aperture in the sealing mechanism retained in the seal receiving region 716, and into the tip receiving region 718. The receipt of the rod in the rod guide is depicted by way of example if FIG. 2B. As described herein, the low-friction bushing 704 supports the rod such that the rod is positioned away from the interior surface of the internal chamber of the housing as well as the interior surface of the rod guide 702. As seen in FIG. 7A, the inner diameter of the bushing cap 706 is larger than the outer diameter of the shaft of the rod so as to avoid any contact between the outer surface of the shaft of the rod and the bushing cap. The outer surface of the rod thus is supported by and contacts the interior surface of the low-friction bushing 704, which allows the rod to freely move through the rod guide 702 thereby driving the tip forward and pulling it backward during a flush cycle of the sediment filtration system. As described in further detail below with reference to FIG. 8B, the outer diameter of the tip (e.g., tip 212 or tip 800 in FIGS. 8A-B) may be smaller than the inner diameter ($id_{11}$) of the tip receiving region 718 of the rod guide 702 so as to avoid any contact between the outer surface of the tip and the interior surface of the tip receiving region.

Figure 8A:
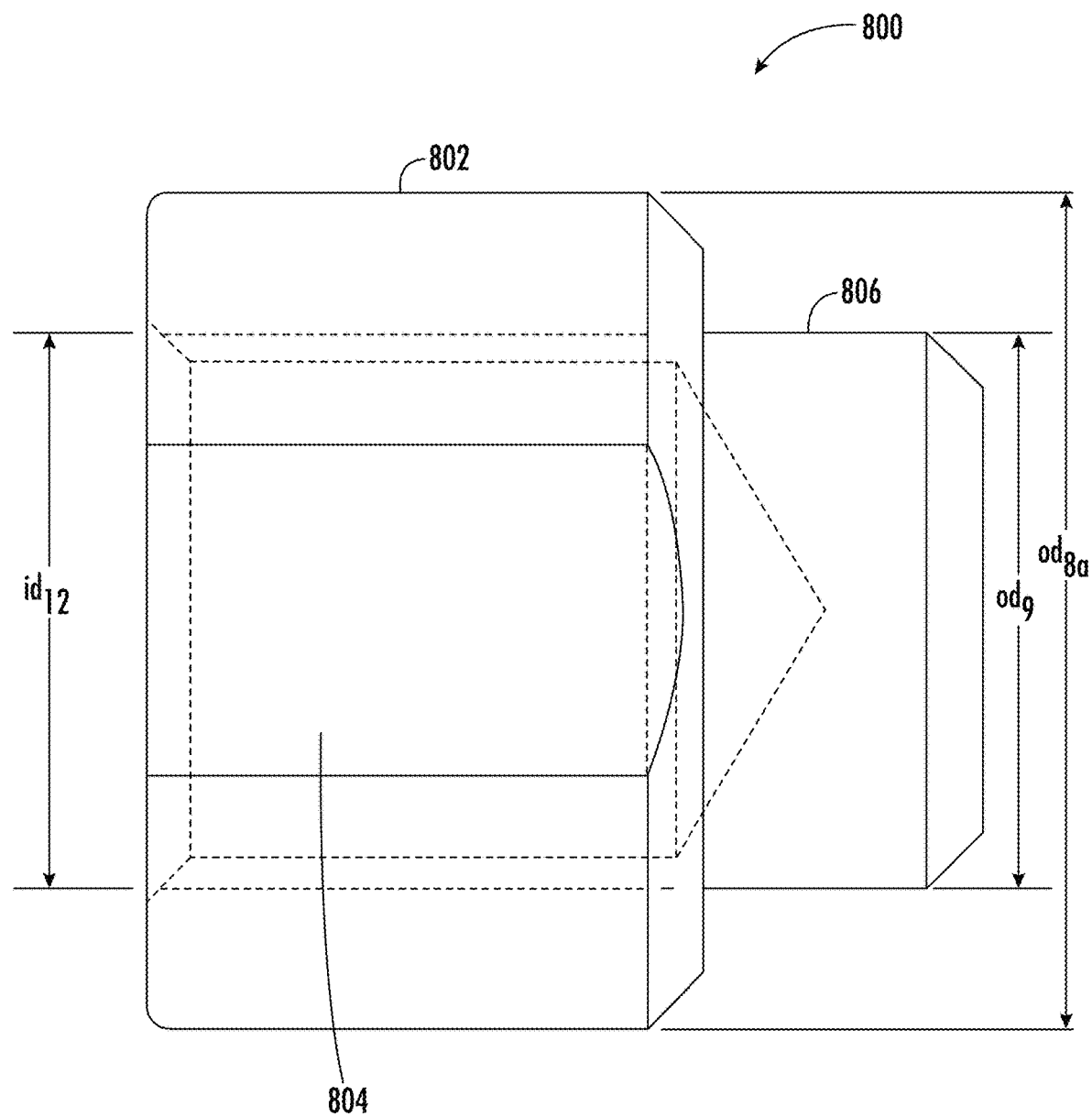
FIG. 8A depicts a side view of an example tip according to various aspects described herein.
Figure 8B:
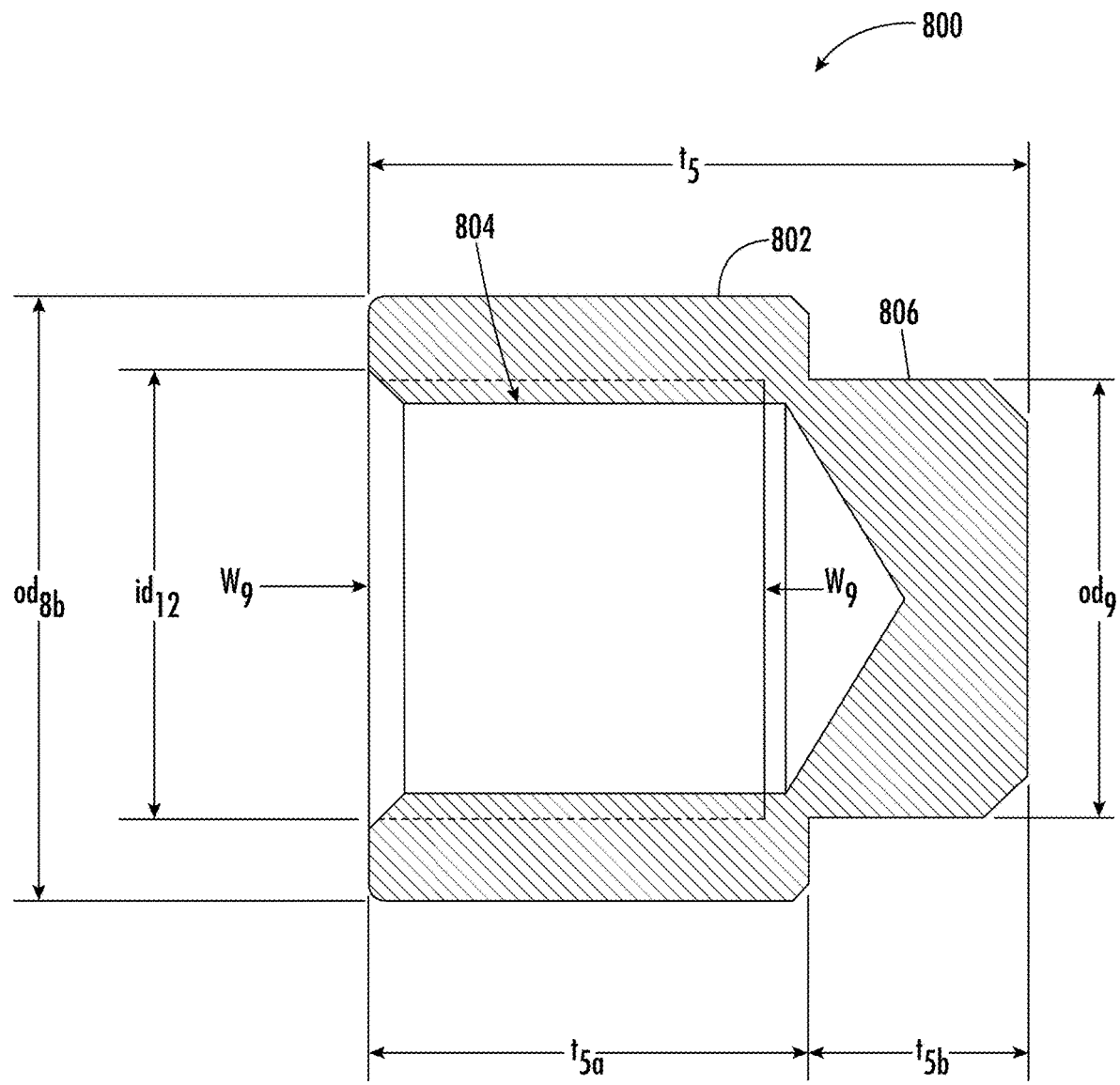
FIG. 8B depicts a side cross-sectional view of the tip of FIG. 8A
Figure 8C:
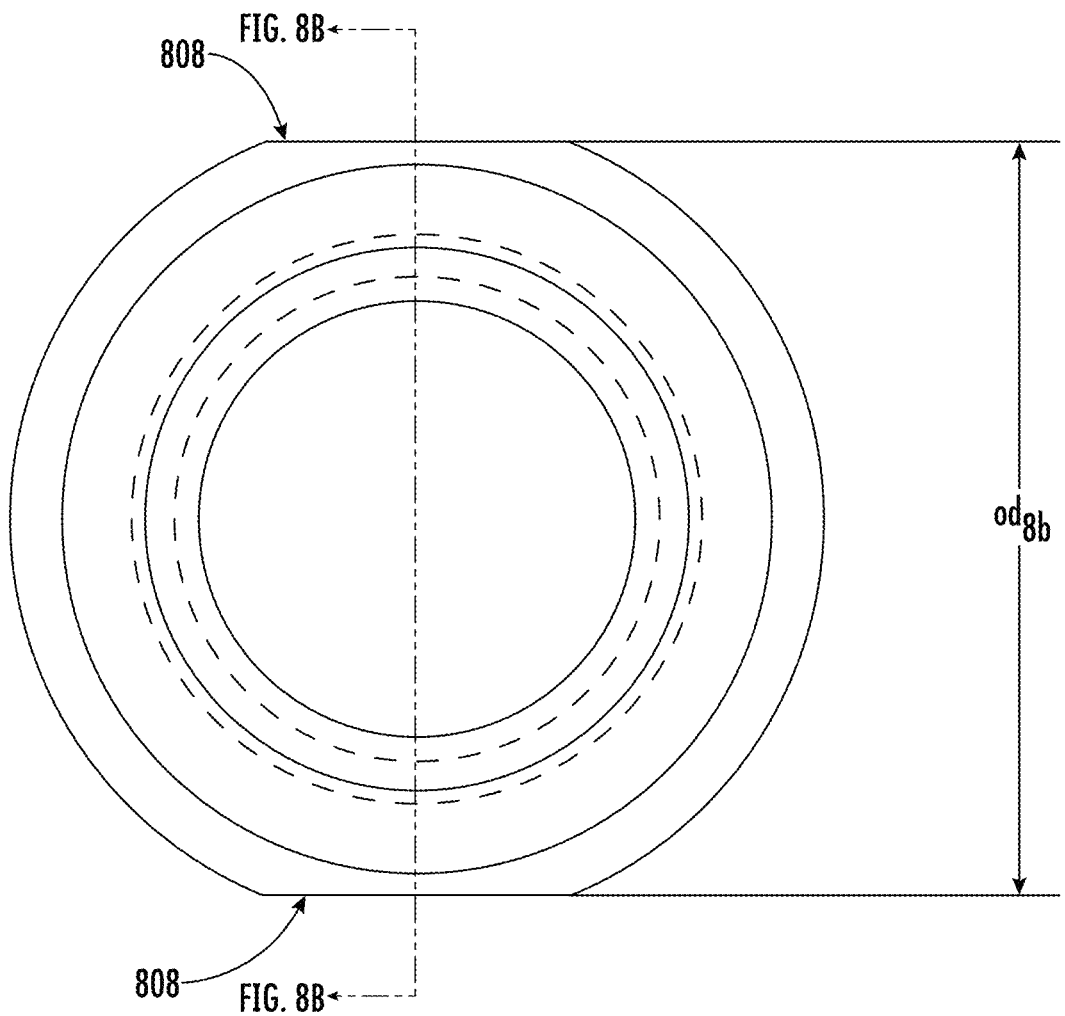
FIG. 8C depicts a front view of the tip of FIG. 8A.

FIGS. 8A, 8B, and 8C respectively depict a side view, a side cross-sectional view, and a front view of an example tip 800 according to various aspects described herein. The cross-sectional view shown in FIG. 8B is along dashed line labeled "FIG. 8B" of FIG. 8C. As described herein, the tip 800, in this example, is configured to attach to (e.g., mount on) the shaft of the rod. For example, the tip 800 may attach to a tip attachment head at the forward end of a rod (e.g., to tip attachment head 314 of rod 300). As also described herein, the tip, in this example, also is configured to engage with an armature (e.g., a cleaning arm) of a sediment filtration system. The tip 800, in this example, thus includes a body 802 defining a cavity 804 configured to receive the forward end of a rod (e.g., a tip attachment head at the forward end of the rod) and an armature engagement portion 806. The cavity 804 thus is sized and shaped to receive the forward end of the rod including, for example, a tip attachment head at the forward end of the rod. The tip 800 may be configured to mount to the forward end of the rod, for example, via threads formed on the interior surface of the cavity 804 of the tip that engage with corresponding threads formed on the outer surface of the forward end of the rod (e.g., threads formed on the outer surface of the tip attachment head).

The outer diameter of the forward end of the rod (e.g., at the tip attachment head) may be about the same as the inner diameter ($id_{12}$) of the cavity 804 of the tip 800 (inclusive of any threaded regions of the rod and the cavity of the tip). The engagement of a tip (e.g., tip 212) with the forward end of a rod (e.g., rod 220) is shown by way of example in FIG. 2B. As seen in FIG. 8A, the cavity 804 may taper in a direction toward the center of the tip 800, which may facilitate installing the tip at the forward end of the rod (e.g., facilitate receipt of the forward end of the rod into the cavity of the tip). The design and configuration of the armature engagement portion 806 will depend on the design and configuration of the armature of the sediment filtration system. The body 802 of the tip 800, in this example, has a substantially cylindrical shape and may include one or more wrench to facilitate installation. The armature engagement portion 806, in this example, is configured as a cylindrical protrusion (e.g., nose, nub, projection, etc.) having an outer diameter ($od_9$) that is less than the outer diameter ($od_{8a}$) of the body 802 of the tip 800. It will be appreciated that, for applications and use cases other than a sediment filtration system, the engagement portion of a tip may have a different design, configuration, shape, etc. The tip 800, in this example, has an axial thickness ($t_5$), which may be the sum of the axial thickness ($t_{5a}$) of the body 802 of the tip and the axial thickness ($t_{5b}$) of the armature engagement portion 806 of the tip (i.e., $t_5 = t_{5a} + t_{5b}$). The tip 800 also may include wrench flats 808 at the outer perimeter of the body 802 to facilitate installation of the tip at the rod using a wrench, ratchet, or other suitable tool. The tip 800 thus may have an outer diameter ($od_{8b}$) at the wrench flats 808 that is less than the overall outer diameter ($od_{8a}$) of the tip (i.e., $od_{8a} > od_{8b}$). The tip 800 may be mounted to and secured on the forward end of the rod in other ways (e.g., via a press fit, an interference fit, etc.).

The dimensions of a as described herein and its various components may depend on a particular implementation and scale up or down depending on the size of the used for a given application or use case. The dimensions of the components, in some examples, may be selected to facilitate retrofitting existing s of sediment filtration systems with hydraulic damper rod support assemblies as described herein. For example, component dimensions may be selected to maintain (not disturb) the stroke length of a hydraulic damper being retrofit with rod support assemblies. The dimensions of the components should be within fit tolerances sufficient to ensure continued operation of the hydraulic damper without introducing the potential for early failure from leaking, binding, or deformation or destruction of the components, which can lead to equipment downtime. Fit tolerances should provide sufficient freedom to facilitate the linear movement of the rod without introducing unconstrained motion that may result in excess wear and without being too tight to overly constrain such motion and impact the desired functionality of the hydraulic damper.

In one example, the components of a hydraulic damper as described herein may have the following dimensions:

sions as set forth in Table I above, a low-friction bushing of a rear rod support assembly may have an overall axial thickness of about 0.500 in., an outer diameter of about 1.600 in. or about 1.605 in., and an inner diameter defined by its central aperture of about 0.605 in. It will be appreciated from the present disclosures that the low-friction bushing of a rear rod support assembly may have an outer diameter that is greater than the outer diameter of the low-friction bushing of a front rod support assembly by virtue of the rear rod support assembly being configured to provide a low-friction contact surface with the interior surface of the housing and the front rod support assembly being configured to fit within a rod guide installed in the housing in order to provide a low friction contact surface with the rod itself. The differential in the respective outer diameters of the low-friction bushings of the front and rear rod support assemblies (e.g., low-friction bushings 236 and

TABLE I

| Component | Example Dimension (Equal or About) |
|---|---|
| Rod | Diameter of Bushing Support Region ($d_1$): 0.600 in. |
| | Diameter of Rod Shaft ($d_2$): 0.750 in. |
| | Axial Length From Position Indicator to End of Bushing Support Region ($l_1$): 7.125 in. |
| | Axial Length From End of Tip Attachment Head to End of Bushing Support Region ($l_2$): 15.445 in. |
| Seal Retainer | Overall Axial Thickness ($t_1$): 0.300 in. |
| | Axial Width of Cavity at Rod Region ($w_1$): 0.250 in. |
| | Axial Width of Cavity at Seal Base Region ($w_2$): 0.050 in. |
| | Overall Outer Diameter ($od_{1a}$): 1.550 in. |
| | Between Wrench Flats ($od_{1b}$): 1.250 in. |
| | Inner Diameter at Seal Attachment Head Region ($id_1$): 0.5 in. |
| | Inner Diameter at Seal Base Region ($id_2$): 1.020 in. |
| Seal Base | Overall Axial Thickness ($t_2$): 0.633 in. |
| | Neck Axial Thickness ($t_{2a}$): 0.393 in. |
| | Flange Axial Thickness ($t_{2b}$): 0.240 in. |
| | Outer Diameter at Flange ($od_{2a}$): 1.550 in. |
| | Between Wrench Flats ($od_{2b}$): 1.250 in. |
| | Outer Diameter at Neck ($od_3$): 1.000 in. |
| | Inner Diameter at Bushing Support Region ($i_{d3}$): 0.610 in. |
| | Inner Diameter at Seal Attachment Head Region ($i_{d4}$): 0.5 in. |
| | Axial Width at Seal Attachment Head Region ($w_3$): 0.488 in. |
| | Axial Width at Busing Support Region ($w_4$): 0.145 in. |
| Rod Guide | Overall Axial Thickness ($t_3$): 1.625 in. |
| | Neck Axial Thickness ($t_{3a}$): 0.375 in. |
| | Body Axial Thickness ($t_{3b}$): 1.250 in. |
| | Flange Axial Thickness ($t_{4a}$): 0.100 in. |
| | Channel Axial Thickness ($t_{4b}$): 0.082 in. |
| | Outer Diameter at Flange ($od_5$): 1.610 in. |
| | Outer Diameter at Channel Bottom ($od_6$): 1.438 in. |
| | Outer Diameter at Neck ($od_7$): 1.125 in. |
| | Inner Diameter (Min.) at Bushing Cap Receiving Region ($id_6$): 1.25 in. |
| | Inner Diameter at Bushing Receiving Region ($id_8$): 1.000 in. |
| | Inner Diameter at Spacing Region ($id_9$): 0.900 in. |
| | Inner Diameter at Seal Receiving Region ($id_{10}$): 1.220 in. |
| | Inner Diameter at Tip Receiving Region ($id_{11}$): 0.875 in. |
| | Axial Width of Bushing Cap Receiving Region ($w_5$): 0.25 in. |
| | Axial Width of Bushing Receiving Region ($w_6$): 0.500 in. |
| | Axial Width of Spacing Region ($w_7$): 0.100 in. |
| | Axial Width of Seal Receiving Region ($w_8$): 0.325 in. |
| | Axial Width of Tip Receiving Region ($w_9$): 0.450 in. |
| Tip | Overall Axial Thickness ($t_5$): 0.750 in. |
| | Body Axial Thickness ($t_{5a}$): 0.500 in. |
| | Armature Engagement Axial Thickness ($t_{5b}$): 0.250 in. |
| | Overall Outer Diameter ($od_{8a}$): 0.750 in. |
| | Between Wrench Flats ($od_{8b}$): 0.688 in. |
| | Armature Engagement Outer Diameter ($od_9$): 0.500 in. |
| | Inner Diameter of Cavity ($id_{12}$): 0.500 in. |

In the example hydraulic damper having dimensions as set forth in Table I above, a bushing cap may have an outer diameter of about 1.25 in. (e.g., 1.251 in. or 1.252 in.) with an inner diameter defined by its central aperture of about 0.875 in. In the example hydraulic damper having dimen-

242) is seen in FIG. 2B. In the example hydraulic damper having dimensions as set forth in Table I above, the seal attachment head of a rod may have an axial length of about 0.710 in. (e.g., with threads extending along the entirety of the axial length of the seal attachment head), and the seal attachment head may be connected to the bushing support region of the rod by a neck having a diameter of about 0.420 in. and an axial length of about 0.080 in. In the example hydraulic damper having dimensions as set forth in Table I above, the tip attachment head of a rod may have a diameter of about 0.500 in. and an axial length of about 0.170 in., and the tip attachment head may be connected to the shaft of the rod by a neck having a diameter of about 0.435 in. and an axial length of about 0.080 in. The dimensions described herein may be appropriately scaled for larger hydraulic dampers as appropriate for a given application or use case.

Figure 9:
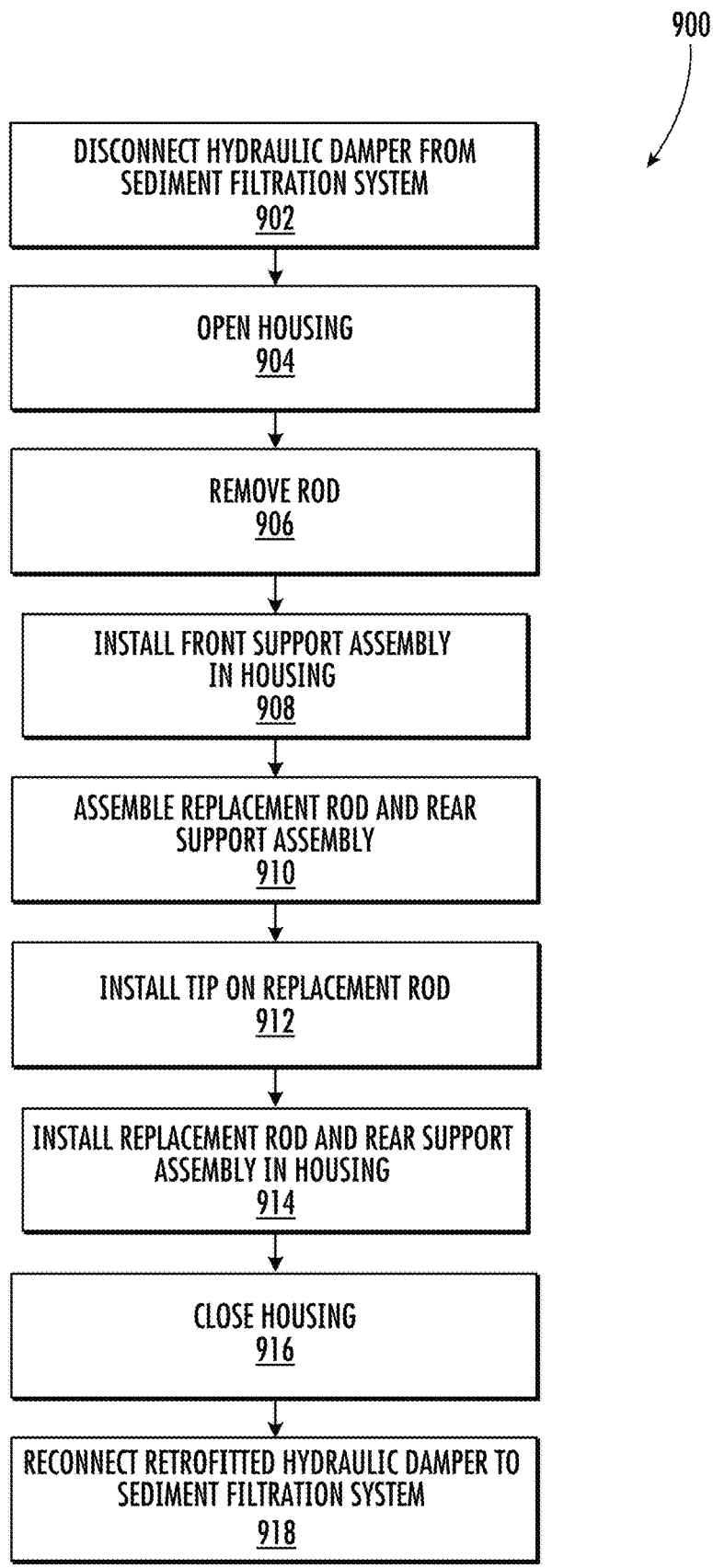
FIG. 9 depicts a flowchart of example method steps for retrofitting a hydraulic damper of a sediment filtration system according to various aspects described herein.

FIG. 9 depicts a flowchart 900 of example method steps for retrofitting a hydraulic damper of a sediment filtration system according to various aspects described herein. Retrofitting a hydraulic damper with a rod support as described herein may begin by disconnecting the hydraulic damper from the sediment filtration system (step 902). Disconnecting the hydraulic damper from the sediment filtration system may include disconnecting the hydraulic damper from the cleaning armature of the sediment filtration system. Once disconnected, the housing may be opened to access the internal components of the hydraulic damper (step 904) such as the rod. Once the housing has been opened, the rod (and other relevant components) may be removed (step 906) in order to install the rod support. The rod support may be installed on the existing rod of the hydraulic damper being retrofit or a new rod may be provided. As described herein, a rod support may include a rear rod support assembly and a front rod support assembly. Installing the rod support thus may include installing the front rod support assembly in the housing of the hydraulic damper (step 908), assembling the replacement rod and rear rod support assembly (step 908), installing the tip on the replacement rod (step 912), and installing the replacement rod and the front rod support assembly in the housing of the hydraulic damper (step 914).

Installing the rear rod support assembly may include installing a low-friction bushing on a bushing support region of the rod (e.g., by inserting the rear end of the rod through a central aperture of the bushing), installing a seal retainer on the rear end of the rod adjacent to the low-friction bushing (e.g., by inserting the rear end of the rod through a central aperture of the seal retainer, engaging respective threads of the rear end of the rod and the seal retainer, and tightening the seal retainer against the low-friction bushing), and installing a seal base on the rear end of the rod adjacent to the seal retainer (e.g., by inserting the rear end of the rod through a central aperture of the seal base, engaging respective threads of the rear end of the rod and the seal base, and tightening the seal base against the seal retainer). Installing the rear rod support assembly also may include installing a seal (e.g., a "U"-cup seal) at the rear rod support assembly such that the seal is retained between the seal retainer and seal base. The sub-assembly of the rod and rear rod support assembly, then may be inserted into the housing of the hydraulic damper with the outer surface of the low-friction bushing being in contact with the interior surface of the housing.

Installing the front rod support assembly may include inserting the front rod support assembly into the front end of the housing such that the rod is received within the rod guide and such that the threads on the outer surface of the rod guide engage with corresponding threads formed on the interior surface of the front end of the housing. The front rod support assembly thus may be screwed into the front end of the housing (e.g., by hand and/or using a wrench, ratchet, or other suitable tool). The front rod assembly may be provided, in some circumstances, in an assembled configuration (e.g., with the seal, low-friction bushing, and bushing cap already installed in their respective positions at the rod guide). In other circumstances, the front rod support assembly may be assembled before installation at the housing. Assembling the front rod support assembly may include installing the sealing mechanism in the seal receiving region of the rod guide, installing the low-friction bushing in the bushing receiving region of the rod guide adjacent to the sealing mechanism, and installing the bushing cap in the bushing cap receiving region of the rod guide adjacent to the low-friction bushing.

Installing the tip may include attaching the tip to the tip attachment head of the rod (e.g., by inserting the tip attachment head of the rod into the cavity of the tip, engaging respective threads of the tip and tip attachment head, and tightening the tip against the tip attachment head. With the replacement rod and rod support installed, the housing of the hydraulic damper may be closed (step 916), and the retrofitted hydraulic damper may be reconnected to the sediment filtration system (step 918). Reconnecting the retrofitted hydraulic damper to the sediment filtration system may include reengaging the tip with the cleaning armature of the sediment filtration system.

A kit thus may be provided for retrofitting a hydraulic damper as described herein. The kit may include, for example, a rod, tip, and a rod support (e.g., with front and rear rod support assemblies) as described herein. The kit also may include one or more sealing mechanisms (e.g., "U"-cup seals, O-rings, etc.).

The disclosures herein may be applied to hydraulic dampers used in other applications and other use cases. For example, the disclosures herein may be applied to hydraulic dampers used with any system that uses fluid (e.g., liquid) pressure to control operation of the hydraulic damper and may be applied in systems that use water or other types of fluids to provide such pressure. Aspects of the present disclosures may be implemented in system that drive hydraulic dampers via other means such as, for example, air-driven hydraulic dampers. Furthermore, while the disclosures herein are described in the context of a hydraulic damper that engages with a cleaning armature of a sediment filtration system, those disclosures may be applied to hydraulic dampers that are configured to engage with other types of systems having hydraulic damper-actuated components (e.g., armatures, arms, etc.).

Although the subject matter has been described in language specific to structural features and/or methodological acts, it is to be understood that the subject matter defined in any statement of examples is not necessarily limited to the specific features or acts described above. Furthermore, while aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only, and are not limiting.

What is claimed is:

1. A hydraulic damper comprising:
   a housing defining an internal chamber;

a fluid-drivable rod disposed within the internal chamber of the housing, the fluid-drivable rod comprising:
  a shaft extending between a first end of the rod and a second end of the rod opposite the first end; and
  a bushing support region at the first end of the rod, wherein a diameter of the bushing support region is less than a diameter of the shaft;
a rod support disposed within the housing and configured to support the fluid-drivable rod within the internal chamber of the housing and to facilitate movement of the fluid-drivable rod between a retracted position and an extended position, the rod support comprising:
  a movable rod support assembly configured to support the first end of the fluid-drivable rod within the internal chamber of the housing and configured to move with the fluid-drivable rod between the retracted position and the extended position, the movable rod support assembly comprising:
    a first bushing disposed on the bushing support region of fluid-drivable rod with the fluid-drivable rod being received through a central aperture of the first bushing, wherein an outer surface of the first bushing is in surface contact with an interior surface of the internal chamber of the housing;
    a seal base disposed on the fluid-drivable rod at the first end of the fluid-drivable rod adjacent to the first bushing with the fluid-drivable rod being received through a central aperture of the seal base and configured to retain the first bushing on the bushing support region of the fluid-drivable rod, the seal base comprising a seal support region and a flange, wherein an outer diameter of the seal support region is less than an outer diameter of the flange, and wherein the outer diameter of the flange is less than the outer diameter of the first bushing;
    a first seal disposed on the seal support region of the seal base with the seal support region of the seal base being received through a central aperture of the first seal; and
    a seal retainer disposed on the fluid-drivable rod at the first end of the fluid-drivable rod adjacent to the seal base with the fluid-drivable rod being received through a central aperture of the seal retainer and configured to retain the seal on the seal support region of the seal base;
  a stationary rod support assembly configured to support the second end of the fluid-drivable rod within the internal chamber of the housing and configured to remain stationary within the internal chamber of the housing during movement of the fluid-drivable rod between the retracted position and the extended position, the stationary rod support assembly comprising:
    a rod guide configured to mount to the interior surface of the internal chamber of the housing with the fluid-drivable rod being received through a central aperture of the rod guide and without any surface contact between an outer surface of the fluid-drivable rod and an interior surface of the rod guide, the interior surface of the rod guide defining a bushing receiving region, a bushing cap receiving region, a seal receiving region, and a tip receiving region, wherein an inner diameter of the bushing cap receiving region and an inner diameter of the seal receiving region are larger than an inner diameter of the bushing receiving region and are larger than an inner diameter of the tip receiving region;
    a second bushing disposed within the bushing receiving region of the rod guide with the fluid-drivable rod being received through a central aperture of the second bushing, wherein the outer surface of the fluid-drivable rod is in surface contact with an interior surface of the second bushing;
    a bushing cap disposed within the bushing cap receiving region of the rod guide with the fluid-drivable rod being received through a central aperture of the bushing cap and configured to retain the second bushing within the bushing receiving region; and
    a second seal disposed within the seal receiving region of the rod guide with the fluid-drivable rod being received through a central aperture of the second seal; and
  a tip mounted at the second end of the rod, wherein the tip is configured to be at least partially received within the tip receiving region during movement of the fluid-drivable rod toward the retracted position.

2. The hydraulic damper of claim 1, wherein the tip is configured to engage a cleaning armature of a sediment filtration system.

3. The hydraulic damper of claim 1, wherein a coefficient of friction between both (i) the outer surface of the first bushing and the interior surface of the internal chamber of the housing and (ii) the outer surface of the rod and the interior surface of the second bushing is about 0.10 to about 0.30.

4. The hydraulic damper of claim 1, wherein the first bushing and the second bushing are each made of a polytetrafluoroethylene (PTFE) material.

5. The hydraulic damper of claim 1, wherein the first bushing and the second bushing are made of a material deemed to satisfy one or more regulatory requirements associated with drinking water.

6. The hydraulic damper of claim 1, wherein an outer surface of the rod guide defines a circumferential channel, and the stationary rod support assembly further comprises a third seal disposed within the circumferential channel.

7. The hydraulic damper of claim 1, wherein the first seal is a first U-cup seal and the second seal is a second U-cup seal.

8. The hydraulic damper of claim 1, wherein the fluid-drivable rod, the seal base, the seal retainer, the rod guide, and the busing cap are made of stainless steel.

9. The hydraulic damper of claim 1, wherein:
the outer diameter of the first bushing is about 1.600 inches and an inner diameter of the first bushing is about 0.750 inches; and
an outer diameter of the second bushing in about 1.000 inches and an inner diameter of the second bushing in about 0.750 inches.

10. A hydraulic damper comprising:
a housing defining an internal chamber;
a rod disposed within the internal chamber of the housing;
a first rod support assembly slidably disposed within the internal chamber of the housing and supporting a first end of the rod, the first rod assembly comprising a first bushing disposed on the rod with the rod being received through a central aperture of the first bushing, wherein an outer surface of the first bushing is in surface contact with an interior surface of the internal chamber of the housing; and a second rod support assembly supporting a second end of the rod opposite the first end of the rod, the second rod assembly comprising:

a rod guide mounted to the interior surface of the internal chamber of the housing with the rod being received through a central aperture of the rod guide and without any surface contact between an outer surface of the rod an interior surface of the rod guide; and a second bushing disposed within the rod guide with the rod being received through a central aperture of the second bushing, wherein an outer surface of the rod is in surface contact with an interior surface of the second bushing.

11. The hydraulic damper of claim 10, wherein the rod is configured to be moved to an extended position by fluid received at the hydraulic damper and is configured to be moved to a retracted position by fluid evacuated from the hydraulic damper.

12. The hydraulic damper of claim 10, further comprising a tip configured to engage a cleaning armature of a sediment filtration system.

13. The hydraulic damper of claim 10, wherein the first rod support assembly further comprises a seal base disposed on the rod adjacent to the first bushing with the rod being received through a central aperture of the seal base, a seal disposed on the seal base, and a seal retainer disposed on the rod adjacent to the seal base with the rod being received through a central aperture of the seal retainer and configured to retain the seal on the seal base.

14. The hydraulic damper of claim 10, wherein the second rod support assembly further comprises a bushing cap disposed within the rod guide adjacent to the second bushing and configured to retain the second bushing within the rod guide.

15. The hydraulic damper of claim 10, wherein the second rod support assembly further comprises a seal disposed within the rod guide adjacent to the second bushing.

16. The hydraulic damper of claim 10, wherein each of the first bushing and the second bushing are made of a wear-resistant material.

17. The hydraulic damper of claim 10, wherein each of the first bushing and the second bushing are made of a self-lubricating material.

18. The hydraulic damper of claim 10, wherein each of the first bushing and the second bushing are made of a polytetrafluoroethylene (PTFE) material.

19. A method of retrofitting a hydraulic damper comprising:

providing a kit comprising:

a rod comprising a shaft having a first diameter and a bushing support region having a second diameter smaller than the first diameter;

a first PTFE bushing comprising a central aperture that is sized and shaped to receive the bushing support region of the rod and having an outer diameter sufficient to be in surface contact with an interior surface of an interior chamber of the hydraulic damper;

a second PTFE bushing comprising a central aperture that is sized and shaped to receive the rod with an outer surface of the rod being in surface contact with an interior surface of the second PTFE bushing; and a rod guide comprising a central aperture that is sized and shaped to receive the second PTFE bushing and configured to mount to the interior surface of the interior chamber of the hydraulic damper;

accessing the interior chamber of a housing of the hydraulic damper;

removing an existing rod from the interior chamber of the hydraulic damper;

installing the rod guide within the housing of the hydraulic damper at a forward end of the hydraulic damper with the second PTFE bushing being received through the central aperture of the rod guide and retained within the rod guide;

mounting the first PTFE bushing on a rear end of the rod with the rod being received through the central aperture of the first PTFE bushing; and installing the rod within the housing of the hydraulic damper with the first PTFE bushing being mounted on the rear end of the rod, wherein installing the rod causes a forward end of the rod to be received through the central aperture of the second PTFE bushing retained within the rod guide.

20. The method of claim 19, further comprising:

disconnecting the hydraulic damper from a sediment filtration system before accessing the interior chamber of the hydraulic damper; and reconnecting the hydraulic damper to the sediment filtration system after installing the rod guide and rod within the housing of the hydraulic damper.

* * * * *